US010028442B1

(12) United States Patent
Crosby

(10) Patent No.: US 10,028,442 B1
(45) Date of Patent: Jul. 24, 2018

(54) SELF-PROPELLED, CLOSE-COUPLED, AUTONOMOUS GRAIN CART

(71) Applicant: Lon Owen Crosby, Webster, IA (US)

(72) Inventor: Lon Owen Crosby, Webster, IA (US)

( * ) Notice: Subject to any disclaimer, the term of this patent is extended or adjusted under 35 U.S.C. 154(b) by 43 days.

(21) Appl. No.: 15/092,582

(22) Filed: Apr. 6, 2016

Related U.S. Application Data

(63) Continuation-in-part of application No. 14/164,160, filed on Jan. 25, 2014, now abandoned.

(60) Provisional application No. 61/956,080, filed on May 31, 2013.

(51) Int. Cl.
| | |
|---|---|
| *A01D 90/16* | (2006.01) |
| *G05D 1/00* | (2006.01) |
| *G05D 1/02* | (2006.01) |
| *B60P 3/00* | (2006.01) |
| *A01B 69/00* | (2006.01) |

(52) U.S. Cl.
CPC .............. *A01D 90/16* (2013.01); *A01B 69/00* (2013.01); *B60P 3/00* (2013.01); *G05D 1/0088* (2013.01); *G05D 1/021* (2013.01)

(58) Field of Classification Search
None
See application file for complete search history.

(56) References Cited

U.S. PATENT DOCUMENTS

| | | | |
|---|---|---|---|
| 9,288,938 B2 * | 3/2016 | Cavender-Bares | A01C 21/002 |
| 2012/0087771 A1 * | 4/2012 | Wenzel | A01F 12/50 414/808 |
| 2013/0019580 A1 * | 1/2013 | Anderson | A01D 41/1208 56/11.2 |

* cited by examiner

*Primary Examiner* — James M McPherson
(74) *Attorney, Agent, or Firm* — Steven C. Wichmann

(57) ABSTRACT

An autonomous self-propelled grain cart for short-coupled operation with a grain harvesting combine includes a frame and an operator's cab affixed to the frame. The operator's cab includes interactive controls for steering, regulating propulsion, and utility operation by an operator. A plurality of drive units propel the cart over the surface of an agricultural field. A grain hopper includes a grain bin and an unloading apparatus. A power system is electrically communicative with the drive units and the grain hopper unloading apparatus. The grain cart also includes a position sensing system, and a control system. The control system includes a central processing unit having an associated memory, a display, a user input device, and an instruction set resident in the memory. The instruction set, when executed and integrated with the position sensing system, functions to autonomously maintain a close-coupled position with respect to an operating combine.

20 Claims, 20 Drawing Sheets

SELF-PROPELLED, CLOSE-COUPLED, AUTONOMOUS GRAIN CART

CROSS-REFERENCE TO RELATED APPLICATION

This Non-Provisional Utility application is a continuation-in-part of U.S. Non-Provisional Application Ser. No. 14/164,160 filed on 25 Jan. 2014, which is included in its entirety and claims the benefit of U.S. Provisional Patent Application Ser. No. 61/956,080, filed on May 31, 2013, which is also incorporated herein in its entirety.

FIELD OF THE INVENTION

The present disclosure generally relates to apparatuses and methods for transporting field harvested grain. More particularly, the present disclosure relates to a self-propelled grain cart capable of self-tracking a combine.

BACKGROUND OF THE INVENTION

The agricultural industry consistently searches for methodologies to improve the yield of field crops. While new and improved varieties of corn, wheat, and soybeans have contributed greatly to increased yields at harvest, methodologies of field preparation and harvest can also impact crop yields either positively or negatively. Operation of combines to harvest the agricultural crops and the concurrent use of grain carts in the field have been identified as major contributors to soil compaction across agricultural fields as combines and grain carts have both high gross and high axle weights. Further, harvesting and marketing of biomass (essentially the stalks of agricultural grain producing plants) is becoming increasingly cost-effective. Thus, preservation of the quantity and quality of agricultural field biomass is becoming of increasing importance. However, the practice of indiscriminate and random passage of field harvest equipment has a negative impact on both the quality and quantity of harvestable biomass.

Additionally, recent years have also shown an increase in harvesting the crop residue, known in the industry as biomass, which can be utilized as forage, bedding, or other commercial applications. The optimal harvesting (removal rate) of biomass can eliminate the need for deep tillage at the end of a crop cycle which minimizes the oxidation of soil organic carbon and is also a factor in soil compaction. This permits the adoption of no-till or minimum-till production approaches in high residue crops which can also reduce soil compaction and enhance soil organic carbon levels in the soil. Both changes can concurrently reduce crop production expenses.

Uncontrolled or indiscriminate operation of heavy vehicles on an agricultural field unnecessarily exacerbates the degree of soil compaction experienced during harvest. Maximum use of tramlines can control compaction in agricultural fields. Tramlines, as used herein, are designated pathways in an agricultural field upon which agricultural implements drive to perform field operations such as combining or traversing the field. Use of tramlines minimizes soil compaction and thus improves the yield of both grain and biomass. Also, minimization of the rundown of biomass leads to an increase in biomass yields and in biomass quality. Increased biomass yield quantity within a field reduces the harvest radius around a biomass processing plant, and hence further reduces harvesting and associated logistics costs. Increased biomass quality permits the optimization of operating processes in the biomass processing plant.

Further, excessive random driving and operation of heavy vehicles in agricultural fields forces surface biomass residue into intimate contact with the underlying soil thereby contaminating the biomass with dirt and reducing the quality thereof. Dirt contamination of biomass is increased with each field operation such as, combining, grain cart operation, biomass harvesting processes such as chopping, raking, etc. Contamination has a further detrimental effect on baling operations and pre-process handling operations such as drying, particle size reduction, classification, etc. at the biomass processing plant. The contamination continues to have negative effects during the utilization process of the biomass (fermentation, gasification, fast pyrolysis, etc.) and the disposal of end-of-process residue.

Soil scientists believe that there are conceptually two types of soil compaction. Deep compaction is driven by axle weight and near surface compaction, typically measured in pounds per square inch, is driven by ground pressure of the drive mechanism in contact with the soil (i.e. tires, agricultural tracks, etc.). While agricultural tracks have a conceptual advantage over tires, poor track design can result in an advantage for tires relative to compaction. One of the problems with tracks is the ground pressure peak that corresponds to the leading and trailing edge of poorly supported or improperly tensioned tracks. Another problem with heavily loaded agricultural equipment including grain carts, and in particular agricultural tracks, is the creation of ridges (berming) and furrows when used in agricultural fields, especially when turning.

Recognition of the very real impact of soil compaction on crop yields is also rapidly growing and thereby leading to interest in s, both permanent and temporary, to create controlled traffic paths across fields. The adoption of tramlines maximizes the quantity and quality of biomass which can effectively be removed from a field and hence the value of the biomass co-product produced by an agricultural field. At the same time, the routine use of tramlines minimizes soil compaction across a field and hence increases the production of both grain and associated biomass within a field.

Sizing crop production equipment such as planters, sprayers, etc. to maximize the efficiency of tramlines is relatively easy, up to a point. Tramline layout in use is driven by equipment size. However, as combines and similar pieces of equipment get larger, the use of tramlines is thwarted by size. With a 30 foot combine header, it is barely possible to run a combine down one tramline while unloading grain into a catch cart running down the next tramline over. With a 40 foot header, extraordinary extensions are required to the combine's unload auger, and modifications to the catch cart are required to utilize a tramline system. A 50 foot header is commercially available outside the USA and development is ongoing with respect to a 60 foot corn head to match with currently available planters covering 24 rows at 2.5 feet per row (i.e. 60 feet in width). For these equipment combinations, full use of a tramline is physically challenging.

However, current practices during the harvesting of grain and biomass from agricultural fields still require excessive passes of equipment including those of the combine, grain carts, choppers, balers, etc. in an uncoordinated and often random, indiscriminate manner. Therefore, a grain cart configuration is needed that is able to coordinate its tracking with a combine such that as a minimum, the combine and grain cart can utilize temporary tramlines within the field to minimize soil compaction and biomass contamination.

SUMMARY OF THE INVENTION

The present disclosure is generally directed to an autonomous self-propelled grain cart for short-coupled operation with a grain harvesting combine. The autonomous self-propelled grain cart includes a frame and an operator's cab and rotatable about a vertical axis between a forward facing orientation and a rear facing orientation wherein the cab is also selectively raised and lowered along the vertical axis. The operator's cab includes interactive controls for steering, regulating propulsion, and utility operation by an operator occupying the operator's cab. The interactive controls generate control signals for transmission via an electrical signal harness to operate systems external to the operator's cab. A plurality of drive units are affixed to the frame for propelling the autonomous grain cart over the surface of an agricultural field. A grain hopper is affixed to and supported by the frame and includes a grain bin for receiving harvested grain and an unloading apparatus for removing the grain from the grain bin. A power system is mounted to the frame and is operationally communicative with the drive units and the grain hopper unloading apparatus. The grain cart also includes a position sensing system and a control system further comprising a central processing unit having an associated memory, a display, the user input device, and an instruction set resident in the memory and executable by the central processing unit wherein the instruction set when executed and integrated with the position sensing system functions to autonomously maintain a close-coupled position with respect to a combine operating on an agricultural field.

In another aspect, the power system includes an electrical generator driven by an internal combustion engine, and each drive unit includes a variable speed electric motor electrically communicative with the electrical generator.

In still another aspect, at least one of the drive units includes a brake, and one of the group consisting of a wheel and an agricultural track.

In yet another aspect, the variable speed electric motor of the drive unit is a switched reluctance electric motor.

In a still further aspect, the drive units are mounted to an end of an axle selectively adjustable to modify a lateral spacing between the drive units.

In still another aspect, the axle comprises an outer box beam and an inner box beam telescopically movable within the outer box beam.

In a further aspect, a hydraulic cylinder has a first end affixed to the outer box beam and a second end affixed to the inner box beam to telescopically move the inner box beam with respect to the outer box beam.

In another aspect, each drive unit is independently steerable of others of the drive units.

In another aspect, the control system receives operational inputs from the interactive controls and further in response thereto the control system generates electrical operational commands to the drive units. The operational commands include at least steering commands, acceleration commands, deceleration commands, and breaking commands.

In yet another aspect, the frame includes at least one attach point for hard coupling the autonomous grain cart to a combine.

In another aspect, the grain bin is subdivided into at least two compartments.

In yet another aspect, an autonomous self-propelled grain cart for short-coupled operation with a grain harvesting combine includes a frame, and a plurality of drive unit affixed to the frame for propelling the autonomous grain cart over the surface of an agricultural field. At least two laterally opposed ones of the drive units define a primary drive axle and at least two laterally opposed ones of the drive units define a steering axle. Each drive unit includes a variable speed electric motor, a break, and a traction member selected from the group consisting of a wheel and an agricultural track. A power system is mounted to the frame proximate to the steering axle and is operationally communicative with the drive units. The power system includes an electrical generator driven by an internal combustion engine wherein the electrical generator is electrically communicative with the variable speed electric motors of the drive units. An operator's cab is supported by the frame proximate to the steering axle and is rotatable about a vertical axis between a forward facing orientation and a rear facing orientation. The cab is also selectively raised and lowered along the vertical axis. The operator's cab includes interactive controls for steering, regulating propulsion, and utility operation by an operator occupying the operator's cab. The interactive controls generate control signals for transmission via an electrical signal harness to operate systems external to the operator's cab. A grain hopper is affixed to and supported by the frame proximate to the primary drive axle and further includes a grain bin for receiving harvested grain and an unloading apparatus communicative with the power system for removing the grain from the grain bin. The autonomous grain cart also includes a position sensing system and a control system further comprising a central processing unit having an associated memory, a display, a user input device, and an instruction set resident in the memory and executable by the central processing unit wherein the instruction set when executed and integrated with the position sensing system functions to autonomously control the autonomous grain cart operating on an agricultural field. The autonomous grain cart is bi-directionally operable wherein a first opera roll direction configuration is a forward facing operator's cab orientation steering axle forward orientation and wherein a second operable directional configuration is a drive axle forward, operator's cab rearward orientation wherein the operator's cab is raised and rotated 180 degrees about its vertical axis.

In another aspect, the variable speed electric motor of the drive unit is a switched reluctance electric motor.

In still another aspect, each drive unit is independently steerable of others of the drive units.

In yet another aspect, the drive units are mounted at an end of an axle having an outer box beam and an inner box beam telescopically received therein and selectively adjustable to modify a lateral spacing between the drive units.

In a still further aspect, a hydraulic cylinder has a first end affixed to the outer box beam and a second end affixed to the inner box beam to telescopically move the inner box beam with respect to the outer box beam.

In another aspect, the control system receives operational inputs from the interactive controls and further wherein in response thereto the control system generates electrical operational commands to the drive units, the operational commands including at least steering commands, acceleration commands, deceleration commands, and breaking commands.

In another aspect, a method of close-coupling an autonomous self-propelled grain cart to a combine for agricultural field harvesting operations wherein the combine is of the type incorporating a position sensing system and continuously transmits the position of the combine during the field harvesting operations. The method includes obtaining a self-propelled grain cart having a frame, an operator's cab supported by the frame and rotatable about a vertical axis between a forward facing orientation and a rear facing orientation and selectively raised and lowered along the vertical axis, the cab also includes interactive controls for steering, regulating propulsion, and utility operation, affixed to the frame are a plurality of independently steerable drive units for propelling the grain cart, a grain hopper, a power system operationally communicative with the drive units and the autonomous grain cart also includes a position sensing system and a control system wherein the control system includes a central processing unit having an associated memory, a display, a user input device, and an instruction set resident in the memory and executable by the central processing unit for autonomously directing the grain cart across the surface of the agricultural field. A desired physical position of the grain cart is determined with respect to the combine. The desired position to be maintained is input into the central processing unit memory. The position transmitted by the combine is received by the autonomous grain cart. The steering and velocity inputs are then calculated for each drive unit to maintain the desired physical position with respect to the combine. The calculated steering and velocity inputs are then sent to the drive units. The receiving, the calculating, and the sending steps are repeated to continuously maintain the desired physical position with respect to the combine.

In a still further aspect, the position sensing system is a global positioning system In yet another aspect, the desired position of the grain cart is calculated relative to the outlet of the unload spout of the combine and so that the drive units of the grain cart substantially track the drive units of the combine.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

Figure 1:
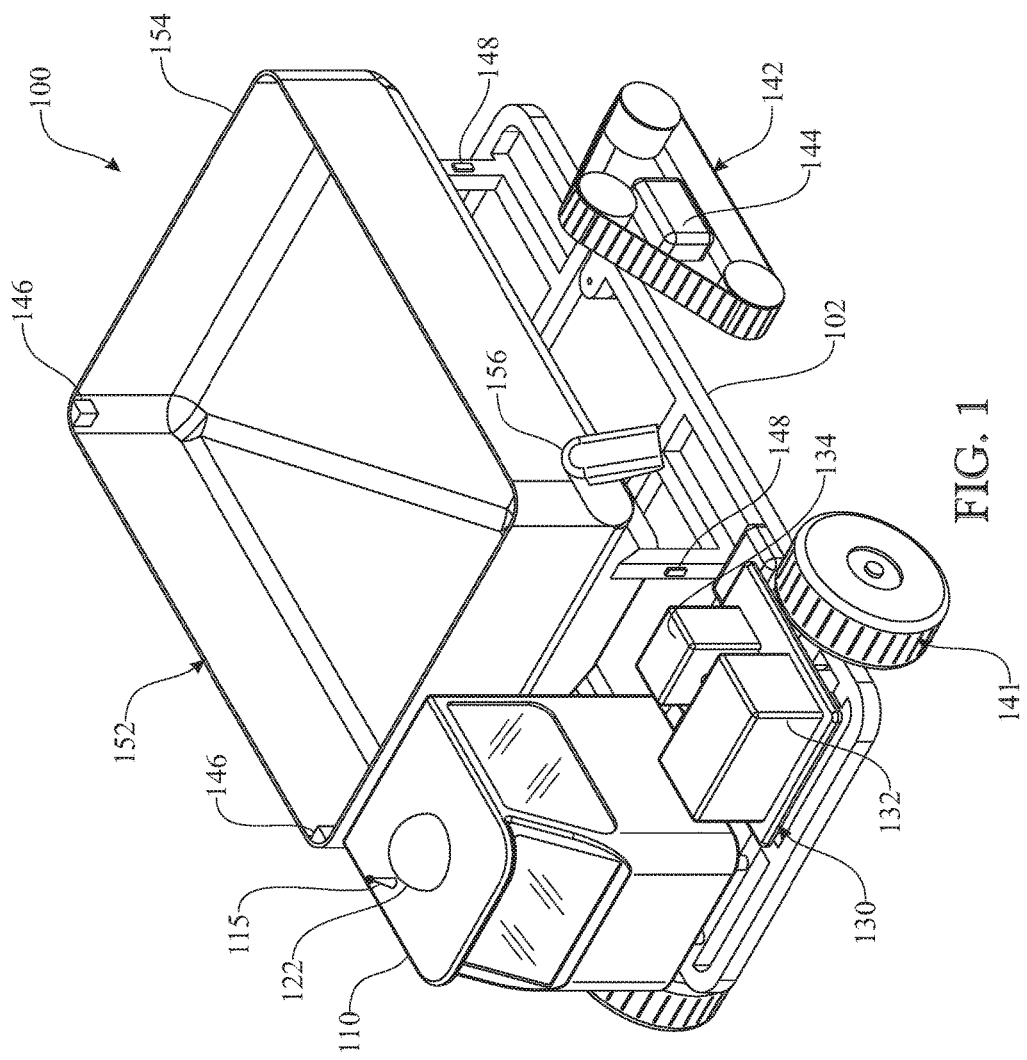
FIG. 1 presents a perspective view of an autonomous grain cart embodying the present invention.
Figure 2:
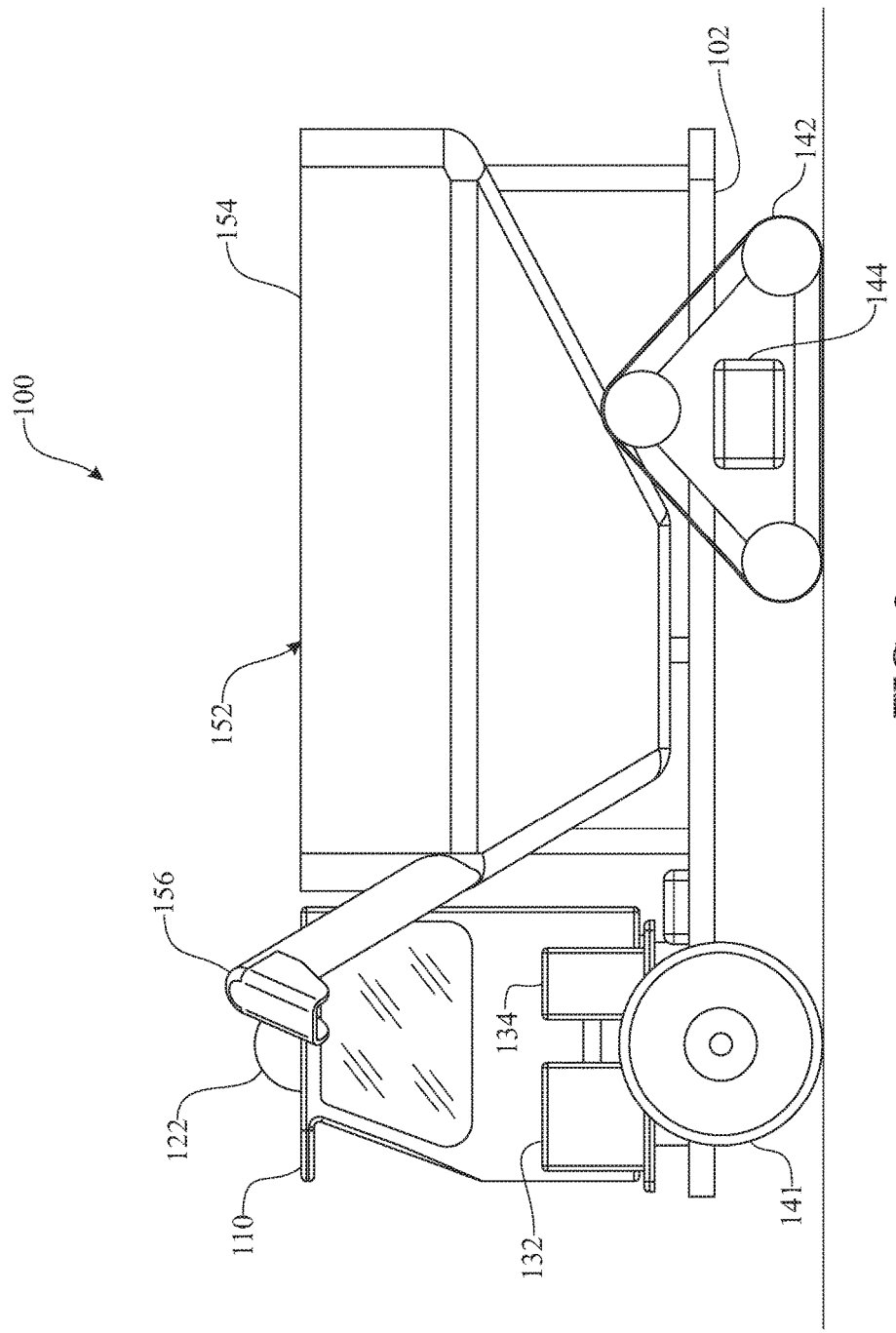
FIG. 2 presents a side elevation view of the autonomous grain cart.
Figure 3:
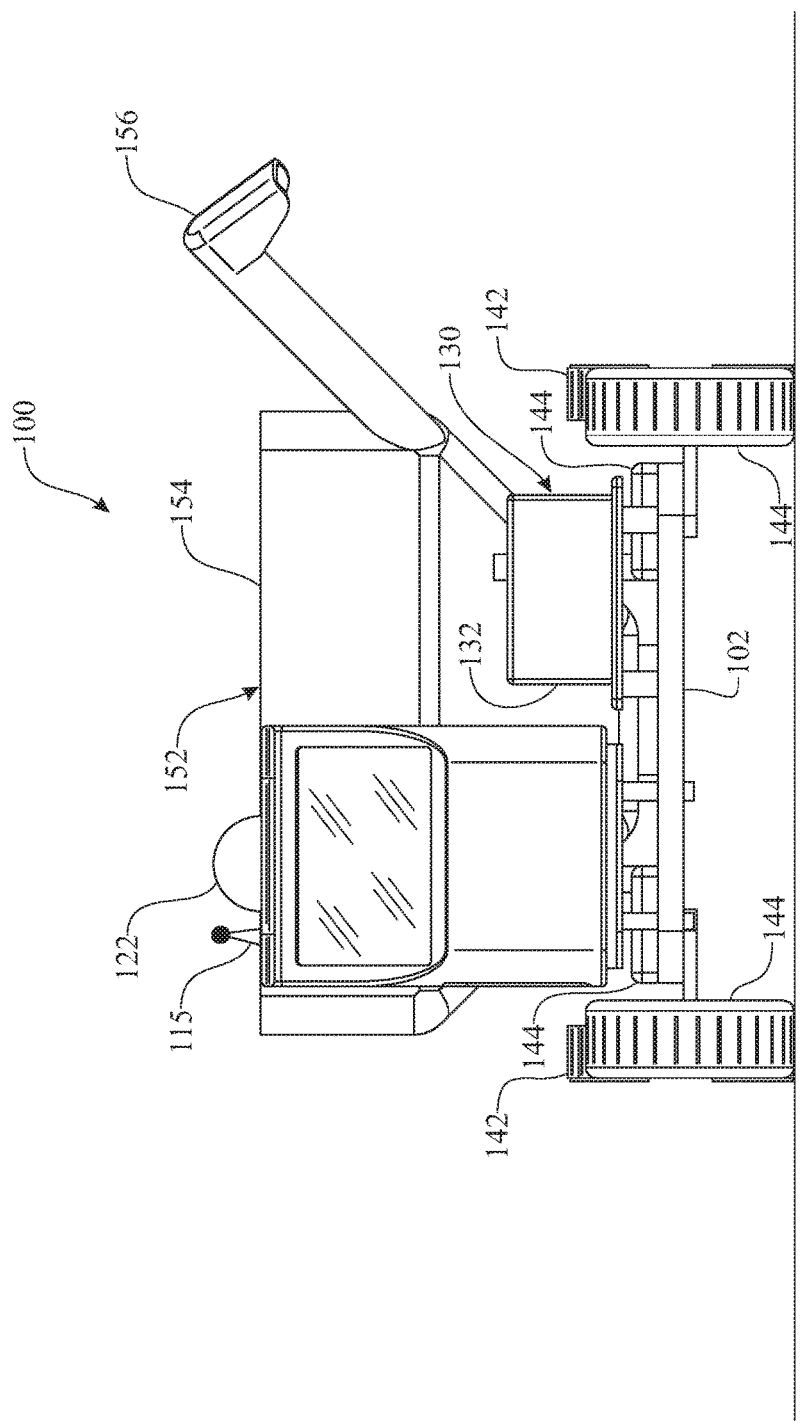
FIG. 3 presents a front elevation view of the autonomous grain cart.
Figure 4:
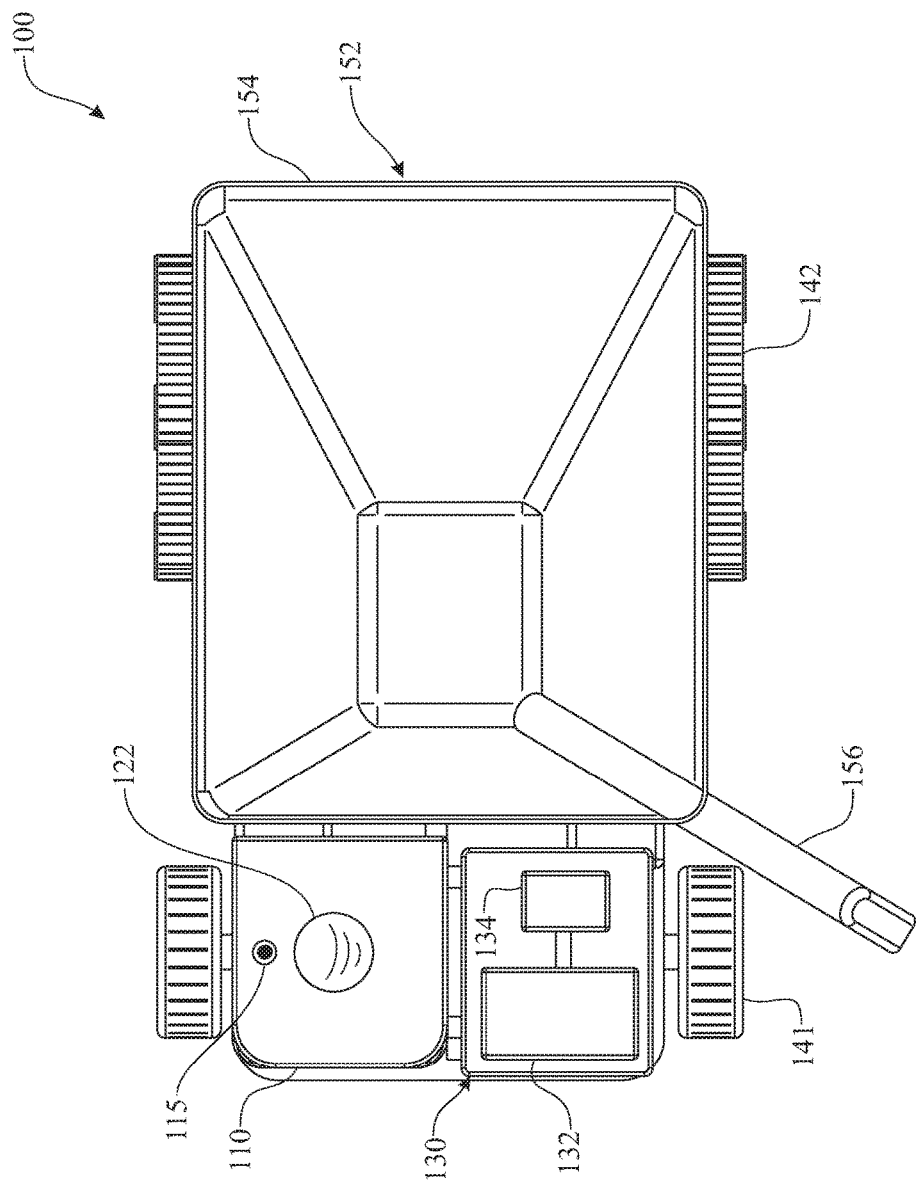
FIG. 4 presents a top plan view the autonomous grain cart.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In one exemplary implementation of the invention, an autonomous self-propelled grain cart 100 is shown in FIGS. 1-4 and FIGS. 8-11 illustrating its various components where an operator's cab is mounted to a front end of a frame 102 and a power system 130 is also mounted to the frame 102. While the various figures illustrate the power system 130 as being mounted adjacent to the operator's cab 110 at the front of the cart 100, those practiced in the art will readily recognize that alternate configurations of the power system 130 placement are possible and contemplated within the scope of this disclosure. The power system 130 includes an internal combustion engine 132 which can be of any known configuration and fueled by diesel, liquefied natural gas (LNG), gasoline, or other combustible fuel. The engine 132 is coupled to and drives an electric generator 134 for producing electrical power utilized to operate the autonomous grain cart 100. Electric operation, which eliminates the need for mechanically connecting drive components, permits the main engine 132 and electric generator 134 to be positioned anywhere around the periphery of the grain cart 100, including under the sides of the grain bin 154 per se. This allows for considerable shortening of the combination of the grain hopper and power source so as to make a short-coupled grain cart 100 feasible. Short-coupling, as defined herein, is the operational mode of the autonomous grain cart 100 wherein the autonomous grain cart 100 is operated in trail directly behind a combine 180 (FIGS. 5-7) and either independent of or hard coupled to the combine 180.

The operator's cab 110 includes therein a seat in which the operator can sit and has access to a steering wheel, foot pedals, and various levers and switches which collectively are referred to herein as manual interactive controls for steering, regulating propulsion, and utility operation of the grain cart by the operator. These controls are typically of a standard configuration and have been eliminated from the various figures for the sake of clarity. As further illustrated in FIGS. 8-10, the operators cab 110, while in its normal forward facing orientation as illustrated in FIGS. 1-4, typically sits below a top edge of the grain bin 154, the operator's cab 110 is configured to rotate about a vertical axis "A" and can also be vertically raised by hydraulic cylinders 124 along axis "A". By raising and rotating the operators cab 110 an operator seated therein can readily operate the grain cart 100 in either a forward or reverse direction. Electronic operation of the grain cart 100 allows the operator's cab 110 to be positioned anywhere around the periphery of the grain cart 100, including a position on top of the grain cart 100.

The autonomous grain cart 100 is supported above and propelled over the surface of the ground by a plurality of drive units 140 wherein the drive unit 140 can employ a traction member such as a wheel 141 or agricultural track 142 which are known in the art. Each drive unit 140 includes a variable speed electric motor 144 for powering the traction member, and in one configuration the electric motor 144 is a switched reluctance electric motor. The variable speed electric motors 144 are electrically communicative with the electric generator 134 for obtaining the electric power necessary for their respective operation. At least two of the drive units 140 are steerable and preferably each drive unit 140 is independently steerable with respect to others of the drive units 140. Alternative approaches (hydraulic, mechanical or combinations of both) to the development of an integrated system are feasible but impose unnecessary design constraints and costs. The drive units 140 of the grain cart 100 can be laterally separated at a width which permits the grain cart foot-print to be substantially equivalent to that of a combine 180 (FIG. 6) being used in harvest. Alternatively, the mounting of the drive units 140 to the frame 102 can be configured such that the lateral foot-print spacing of the drive units 140 can be adjusted to align with the foot-print of a combine 180 or other foot-print widths as required to minimize the field area subject to compaction. In this manner, the drive units 140 of the autonomous grain cart 100 track in line with the drive units 188, 189 of the combine (FIG. 6)

Figure 11:
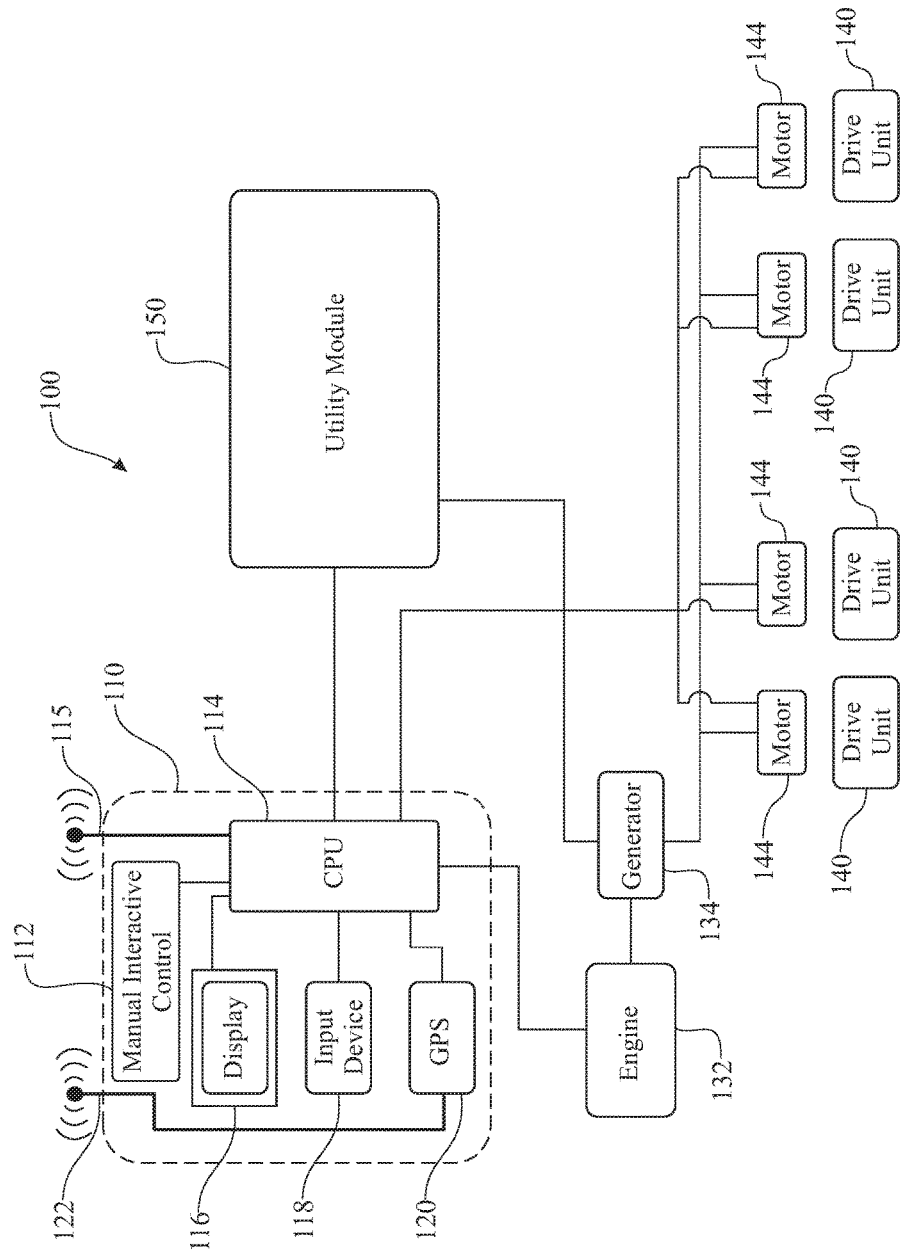
FIG. 11 presents a system block diagram of the autonomous grain cart.

FIG. 11 illustrates in block format the operational system of the grain cart 100. Within the operator's cab 110 a control system comprises a central processing unit (including a memory) 114, a display 116, and an input device 118. The input device 118 can be either a keyboard of known configuration or alternatively be incorporated into the display 116 wherein display 116 includes a touch sensitive screen for receiving operator inputs in a manner known in the industry. The manual interactive controls 112 including the steering wheel, foot pedals, and operational levers and switches provide signal inputs to the central processing unit 114. The executable instruction set within the memory of the central processing unit 114 then issues the required control commands to the engine 132, utility module 150 (FIG. 13), and the individual drive units 140 and motors 144. In this manner, mechanical linkages and interfaces with various elements of the grain cart 100 are eliminated, thereby facilitating the ability of the operator's cab 110 to be raised, lowered, and rotated as previously discussed. Also included and interfacing with the central processing unit 114 is a positioning system 120 herein shown as a global positioning system. An antenna 122 is affixed to the operator's cab 110 for receiving global positioning system signals for determining the geographical position of the autonomous grain cart 100. The central processing unit 114 can also receive via antenna 115 one or more signals transmitted by a combine 180 (FIGS. 5-6) denoting the geographical position and orientation of the combine 180. Operation of a utility module 150 can be controlled via manual inputs to the manual interactive controls 112 or to the input device 118 with the operational control commands being issued by the central processing unit 114. The instruction set resident on the central processing unit 114 is capable in execution thereof to autonomously maintain a desired close-coupled position with respect to the combine 180 while operating in an agricultural field by issuing velocity commands to the electric motors 144 and steering commands to the drive units 140.

Also mounted to the frame 102 is a grain hopper 152 which typically comprises a gravity flow grain bin 154 and an unload apparatus 156. The unload apparatus 156 is here illustrated as a grain auger of a known configuration. The unload apparatus 156 is powered by the generator 134 and operationally controlled from the operator's cab 110. The grain hopper 152 can incorporate sensors such as one or more optical sensors 146 or load sensing strain gauges 148 to determine when the grain hopper 152 has been filled to maximum quantity or maximum weight load respectively.

Figure 5:
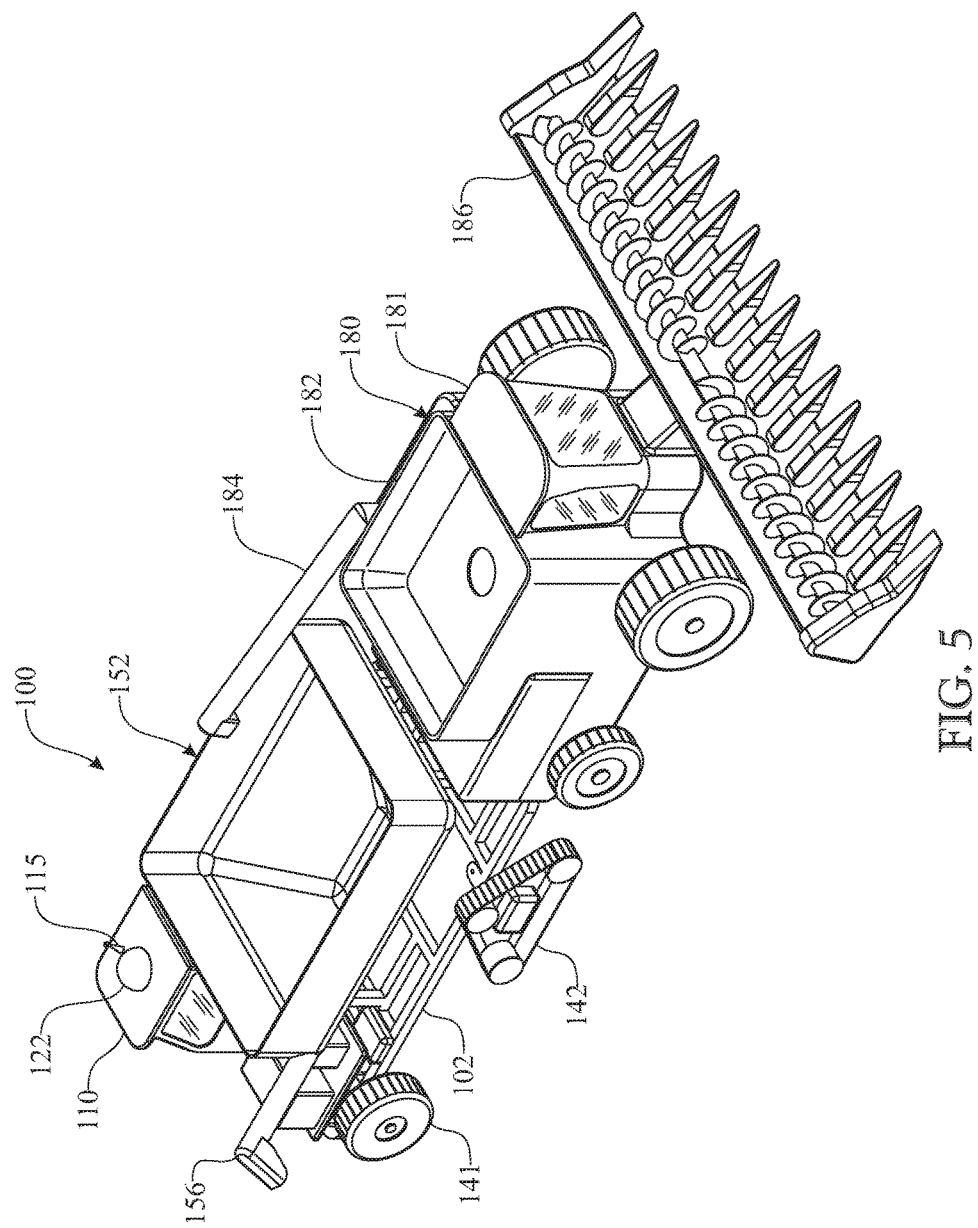
FIG. 5 presents an isometric view of the autonomous grain cart of FIG. 1 hard coupled to a combine.
Figure 6:
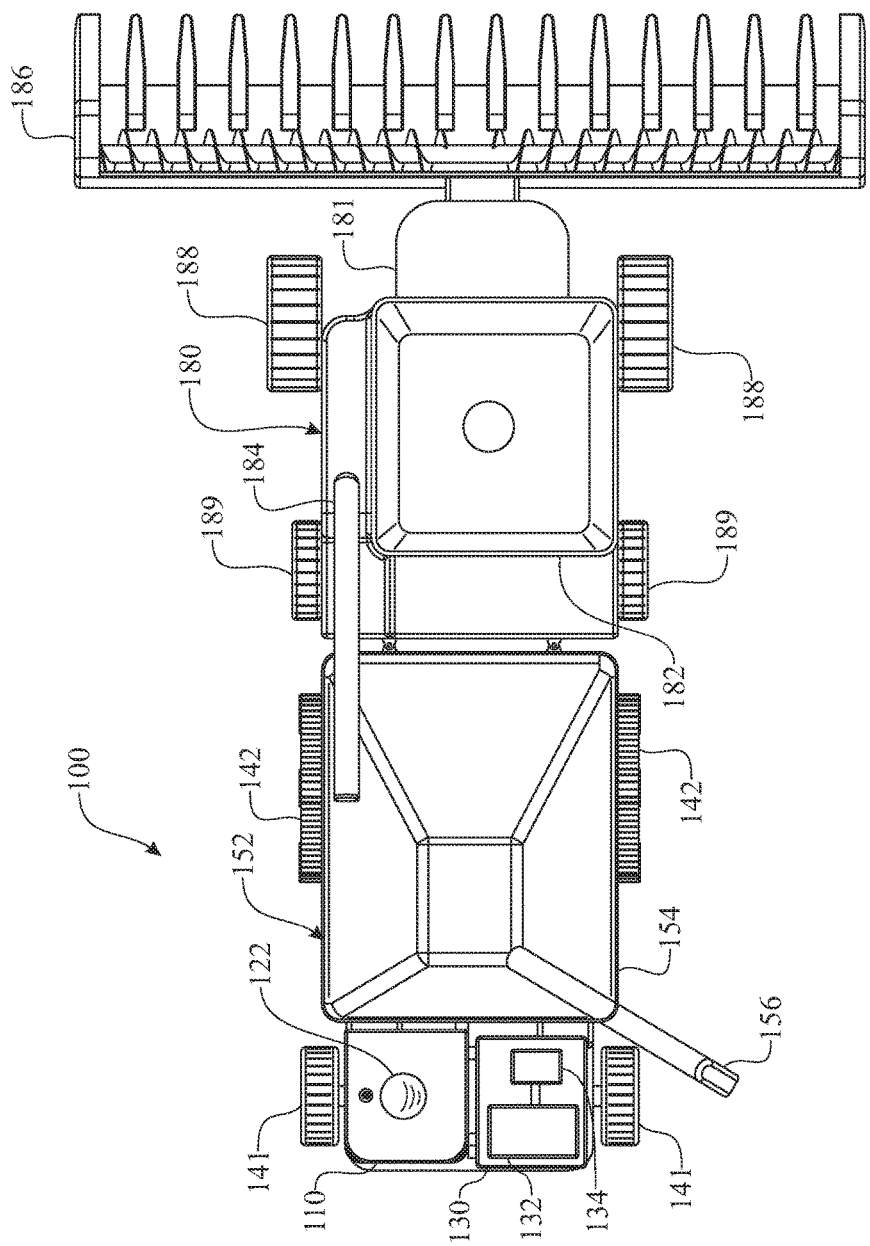
FIG. 6 presents a top plan view of the autonomous grain cart hard coupled to the combine.
Figure 7:
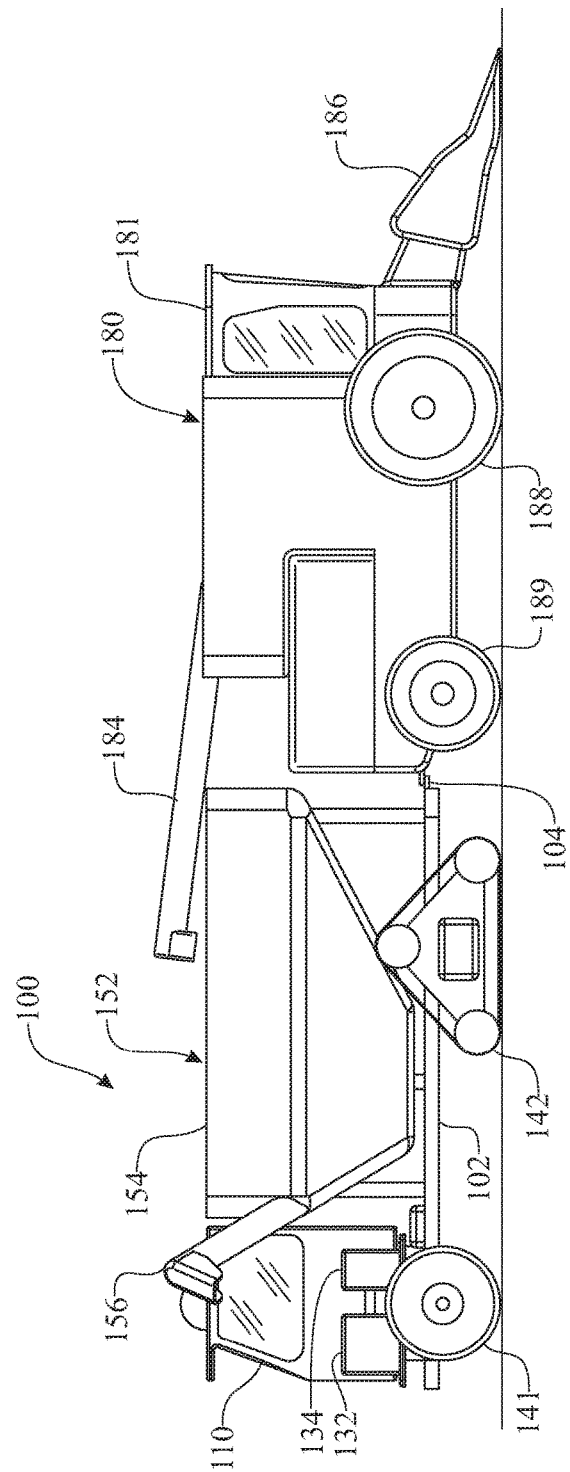
FIG. 7 presents a side elevation view of the autonomous grain cart hard coupled to the combine.
Figure 8:
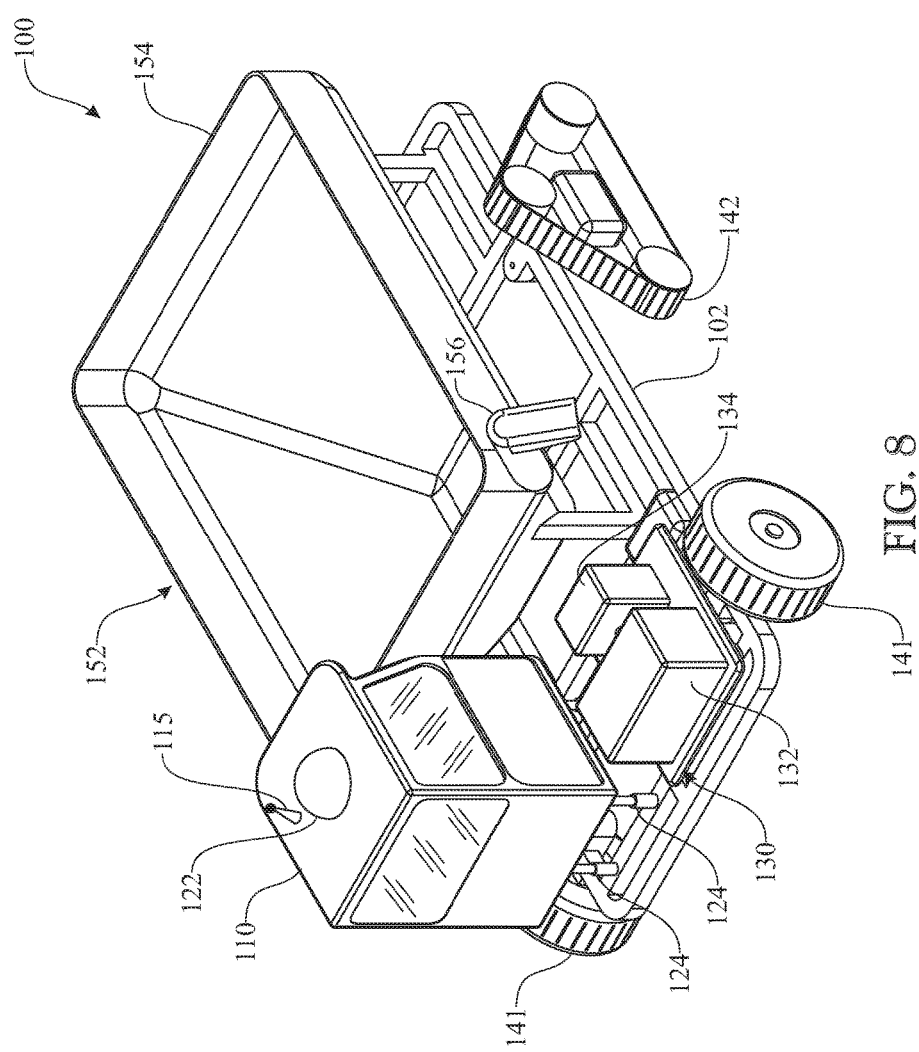
FIG. 8 presents an isometric view of the autonomous grain cart with the operator's cab elevated and rotated 180°.
Figure 9:
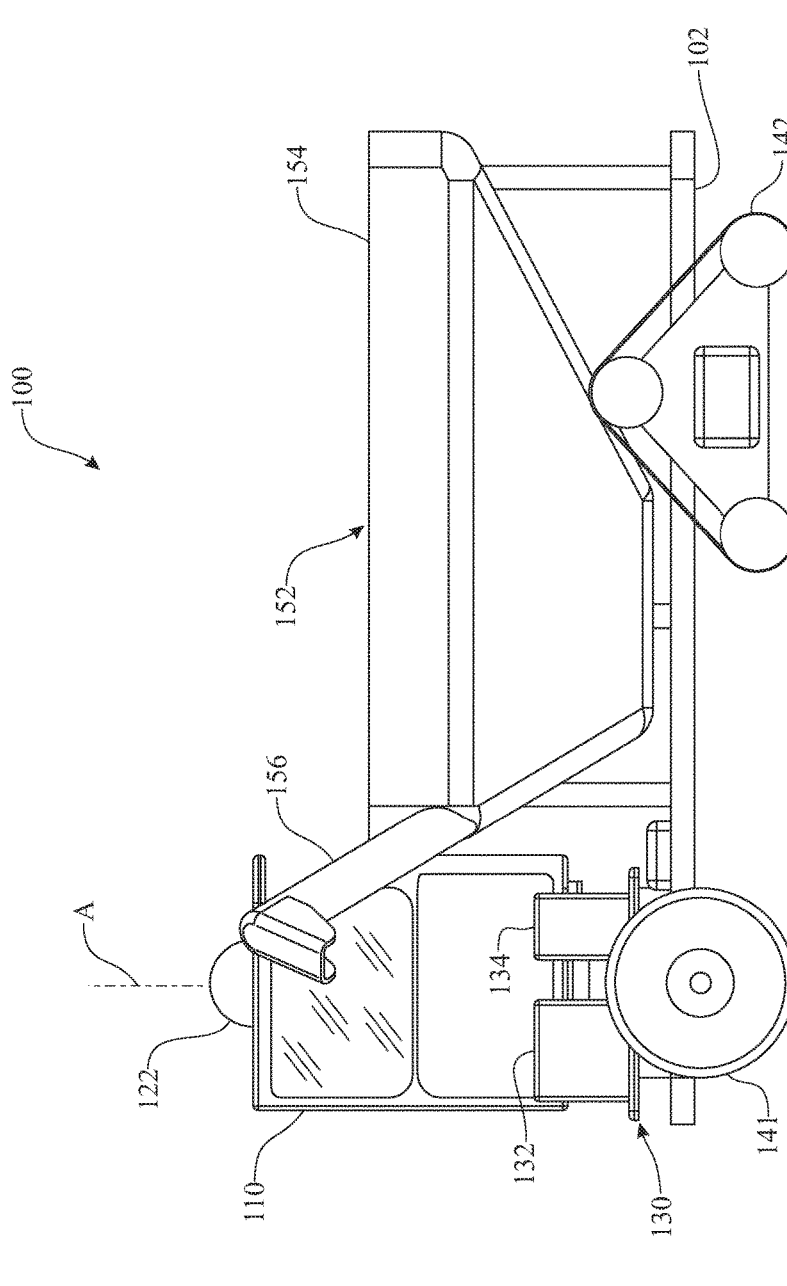
FIG. 9 presents a side elevation view of the autonomous grain cart with the operator's cab elevated and rotated 180° enabling an operator to view over the top of the grain hopper.
Figure 10:
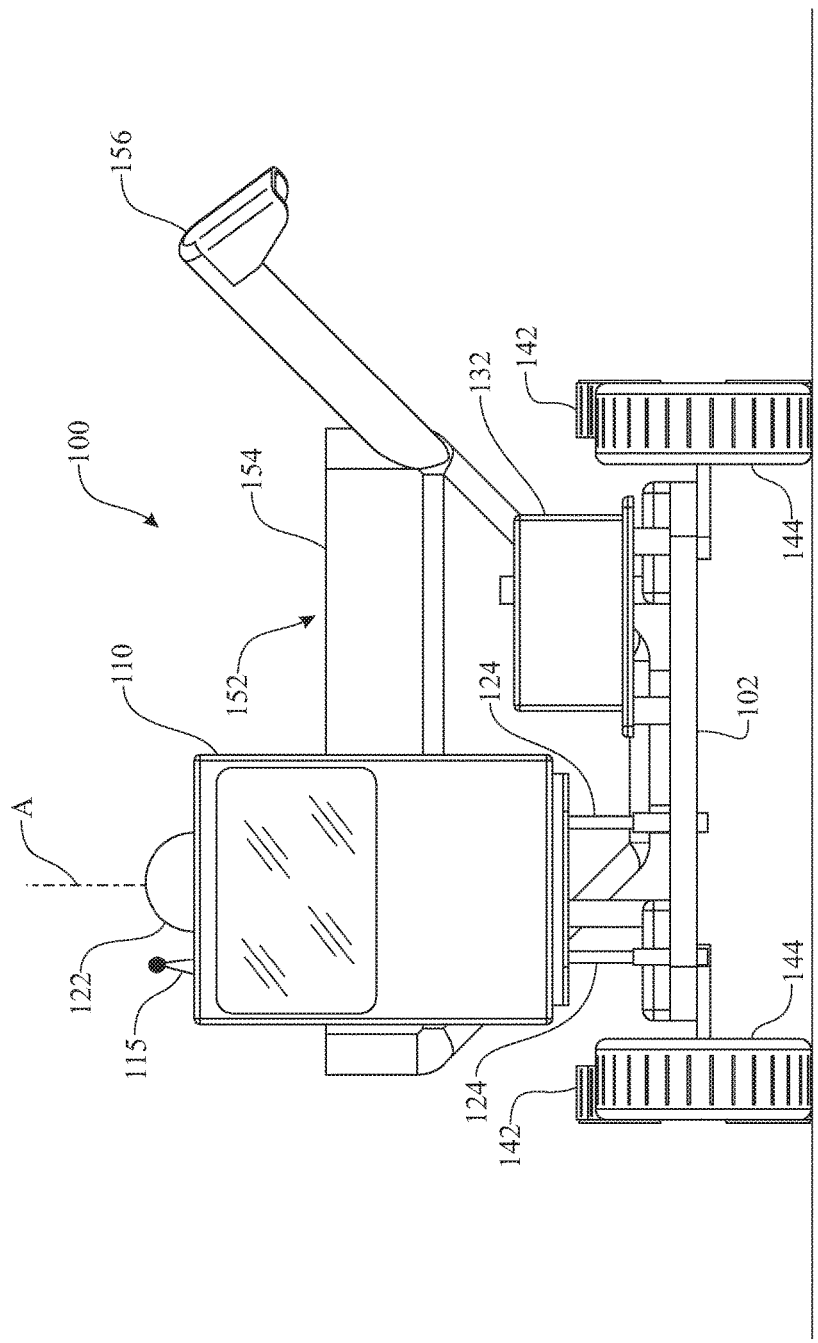
FIG. 10 presents an end elevation view of the autonomous grain cart with the operator's cab elevated and rotated 180°.

In use, and as illustrated in FIGS. 5-6, a combine 180 with an operator's cab 181 at the front thereof for agricultural field harvesting operations has a header 186 mounted at a front thereof for collecting from the agricultural field the grain and its associated biomass such as corn, wheat, and soybeans. The combine 180 also includes a hopper 182 for collecting the grain separated from the biomass. An unload auger 184 extends to the rear of the combine 180 and is configured for operation in this orientation. The desired position of the autonomous grain cart 100 desired to be maintained with respect to the combine 180 is input into the memory of the central processing unit 114. In a process described in greater detail below, the position of the combine 180 is transmitted by systems resident on the combine 180 and received by the autonomous grain cart 100. The positioning system 120 of the autonomous cart 100 determines the physical position of the autonomous grain cart 100 with respect to the combine 180. The central processing unit 114 in execution of the instruction set therein calculates the steering and velocity inputs for each of the drive units 140 to maintain the desired physical position of the autonomous grain cart 100 with respect to the combine 180. The central processing unit 114 then sends the calculated steering and velocity inputs, in the form of commands to the drive units 142, maintain the desired relative position to the combine 180 and to maintain alignment with the drive units 188, 189 of the combine 180. This process is continually repeated during field operations to maintain relative positioning while traversing the field during harvesting operations. By continuously unloading grain from the combine 180 into the grain cart 100 during harvest while operating in the combine's tracks, the weight of the combine and hence soil compaction can be minimized. This represents a significant crop production advantage.

Operation of a heavy grain cart 100 in close proximity to the rear of an operating combine 180 in agricultural fields requires adaptive software regardless of whether the grain cart is being operated in a fully-autonomous, semi-autonomous, or manual mode. This type of agricultural operation requires a ruggedized systems that can account for heavyweights (upwards of 200,000 pounds in a 2000 bushel capacity grain cart 100 and a combine weight approaching 100,000 pounds), rough surfaces, variable traction, mud, snow, ice, fast response times because of the close operating proximity, and redundant independent systems. A physical configuration which places the grain bin 154 of the grain cart 100 at the front or leading orientation during the grain transfer process (i.e. from combine 180 to grain cart 100) and to be filled on-the-go while following the combine 180 using the same footprint (i.e., will tracks and/or agricultural track tracks) as the combine 180 with the grain unload auger 184 in its parked position minimizes the soil compaction zone within every field. This also minimizes modifications needed, if any, to the combine 180 required to utilize tramlines during crop harvesting operations.

Figure 12:
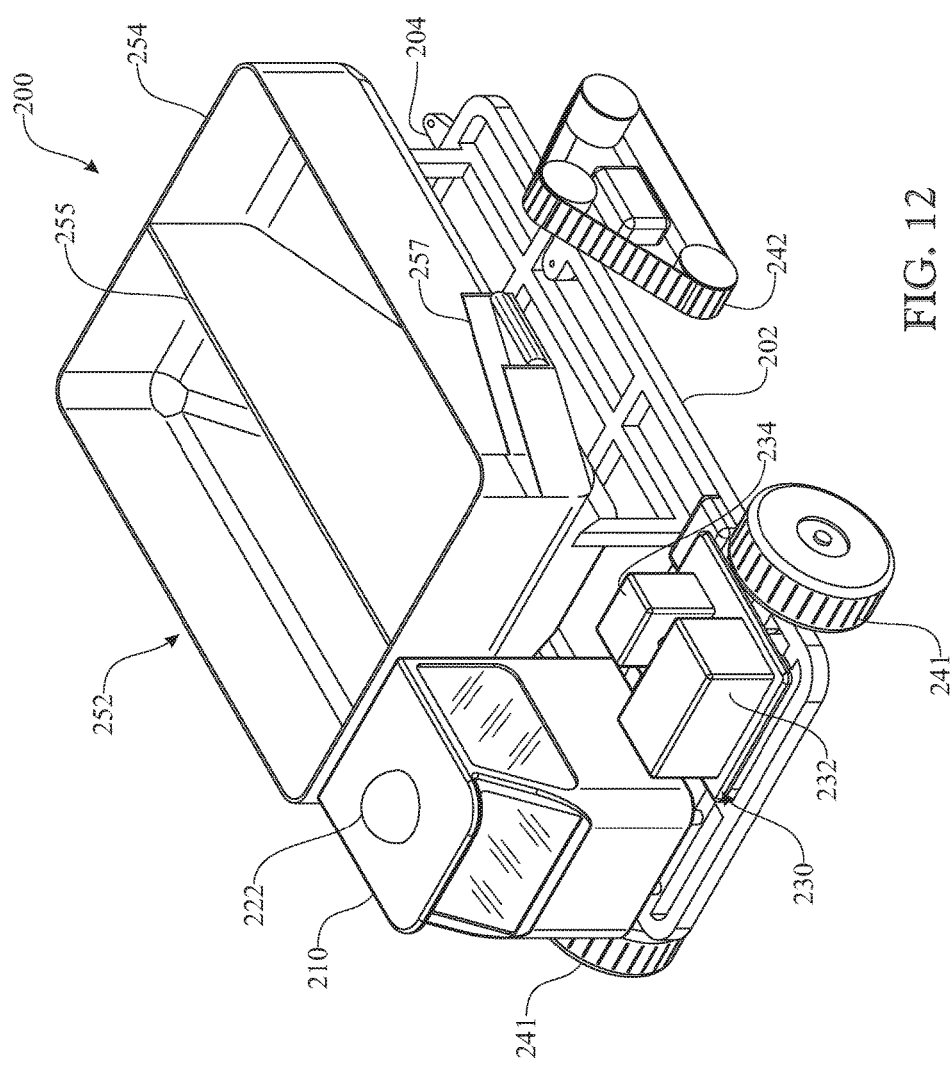
FIG. 12 presents a front isometric view of an alternate embodiment autonomous grain cart wherein the grain hopper is bifurcated and incorporates a conveyer belt unloader.

Alternatively, the autonomous grain cart 100 can be hard-coupled to the combine 180 utilizing one or more couplers 104, 204 (FIG. 12). In this manner, electronic communication between the autonomous grain cart 100 and the combine 180 can be hard wired (not shown) in lieu of wireless communication. The hard-coupling of the autonomous grain cart 100 to the combine 180 can also facilitate utilization of the autonomous grain cart 100 to provide additional traction assistance to the combine 180 in one or more directions if needed. Coupling between the combine 180 and the self-propelled grain cart 100 may also be loose (as in a trailer connection) or closely-coupled (i.e., not physically connected) depending upon the conditions under which grain is being harvested. Command and control may be hardwired through a connector or established via a wireless connection (radiofrequency, light, sound, etc.).

Turning to FIG. 12 an alternative autonomous grain cart 200 is illustrated wherein like features to autonomous grain cart 100 are identified with like reference numerals preceded by the numeral "2". The grain bin 254 of the grain hopper 252 includes a partition 255 separating the grain bin 254 into two sub-bins. In this manner two different grains or two different qualities of the same grain can be transported without cross-contamination. Also, the unload mechanism 257 is configured as a conveyor which reduces physical damage to individual grain kernels as compared to the operation of a grain auger. The conveyor 257 can be a dual belt vertical lift conveyor system, such as disclosed in U.S. Patent Application Publication US 2013/0008764 A1, which allows high volume grain unload rates with minimal impact on grain quality (as compared to an auger based system). The frame 202 also includes at a rear thereof (opposite from the operator's cab 210) a hard-coupling point 204 for hard-coupling to the combine 180.

Figure 13:
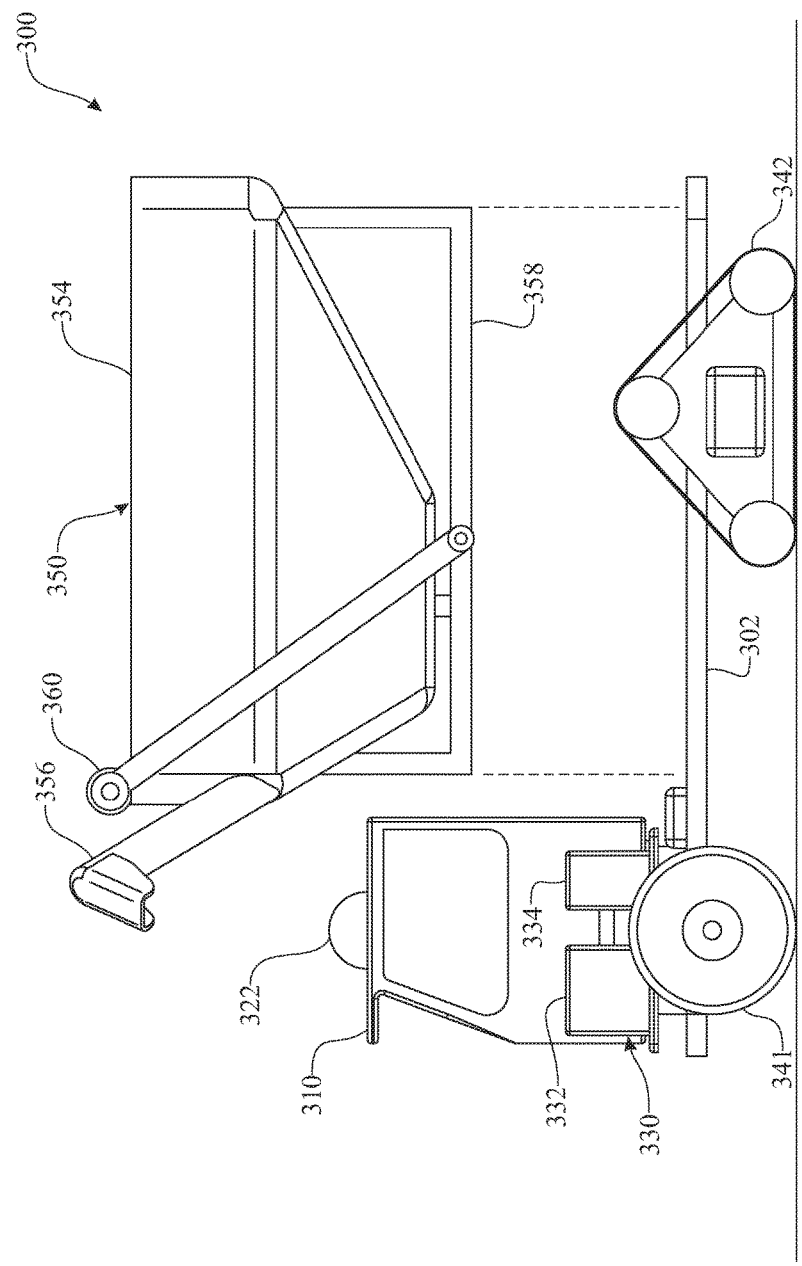
FIG. 13 presents a side elevation view of an alternate embodiment autonomous grain cart wherein the grain hopper comprises a module which is interchangeable with other utility modules.
Figure 14:
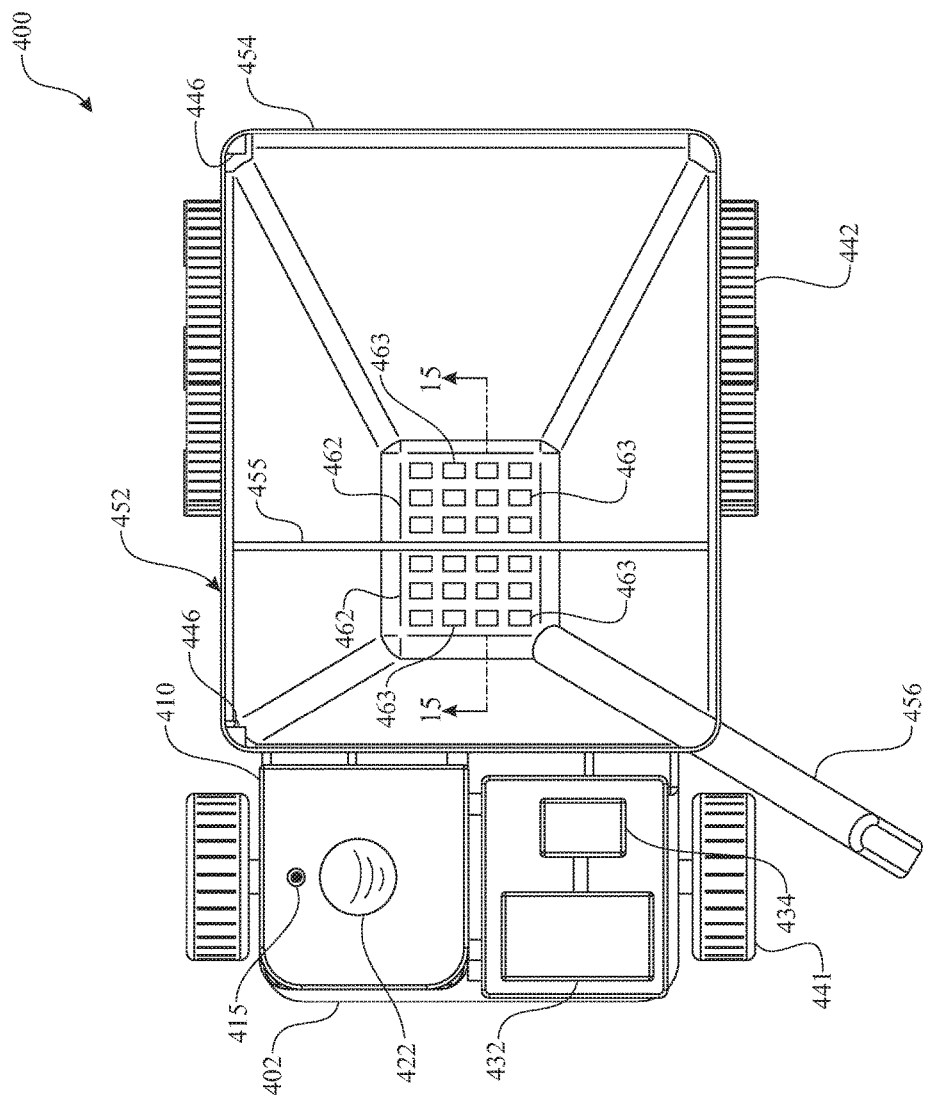
FIG. 14 presents a top plan view of an alternate embodiment autonomous grain cart.

Turning to FIG. 13 another alternative autonomous grain cart is configured as an autonomous agricultural vehicle 300 which is illustrated wherein like features to autonomous grain cart 100 are identified with like reference numerals preceded by the numeral "3". The autonomous grain cart 300 is constructed in modular form wherein the operator's cab 310, the power system 330, and the drive units 341, 342 are mounted to the frame 302 in the same manner as grain cart 100. However, the frame 302 is adapted to receive a variety of utility modules 350 for interchangeable mounting thereon. The utility module 350 also includes a protective tarp system 360 for covering the grain bin 354 to text the grain therein from inclement weather such as rain or snow. Those practiced in the art will readily recognize that the protective tarp system 360 can also be incorporated on other embodiments of the autonomous grain cart 100, 200.

As illustrated in FIG. 13, utility module 350 comprises a grain bin 354 mounted to a support frame 358 wherein the support frame 358, in turn, interchangeably mates to the frame 302. The interchangeability is further facilitated by adopting a uniform mounting configuration common to other utility modules 350. By designing the self-propelled grain cart 100 as an agricultural vehicle of a modular configuration 300, the grain hopper 354 can be readily swapped for other utility modules 350, such as another grain hopper, a field chemical applicator, a planter, a granular fertilizer applicator, a liquid fertilizer applicator, a seed tender, and a water tanker, etc., to increase equipment utilization efficiency.

A further alternate embodiment autonomous grain cart 400 is illustrated in FIGS. 14-17 wherein like features to autonomous grain cart 100, 200, 300 are identified with like reference numerals preceded by the numeral "4". The autonomous grain cart 400 includes a gravity flow grain bin 454 which incorporates one or more optical sensors 446 for determining when the grain bin 454 has reached a volumetric capacity. The grain cart 400 further includes a plurality of load sensors (not shown) similar to load sensing strain gauges 148 (FIG. 1).

Figure 15:
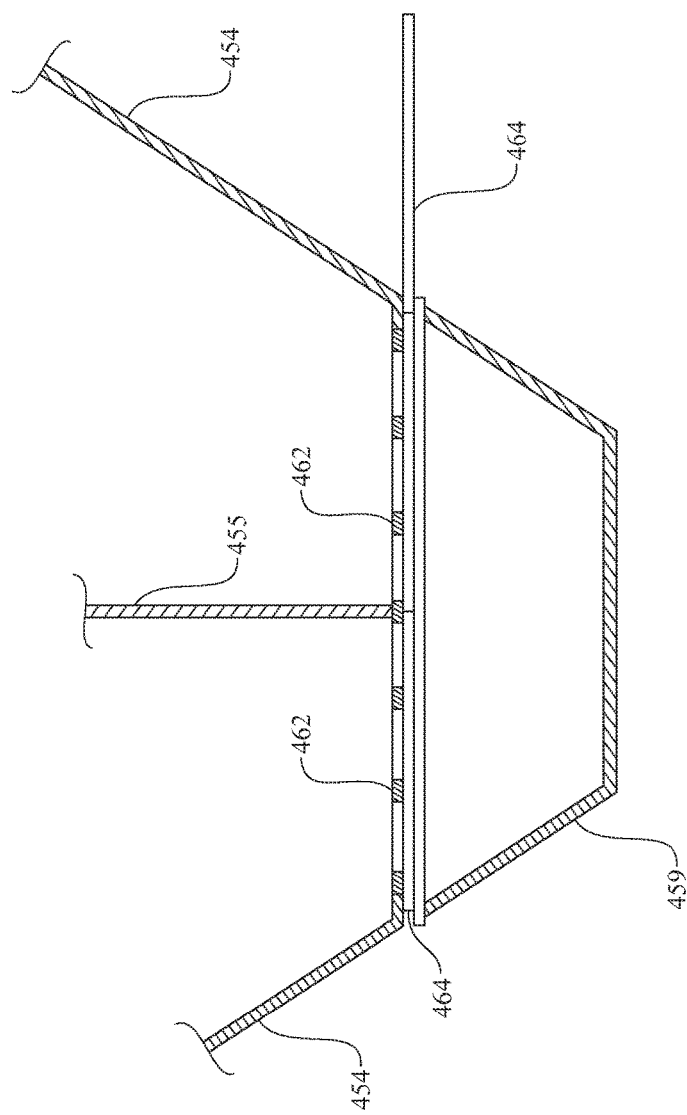
FIG. 15 presents a cross-sectional elevation view of the lower portion of the grain hopper of the autonomous grain cart of FIG. 14, taken along the line 15-15, FIG. 14.
Figure 16:
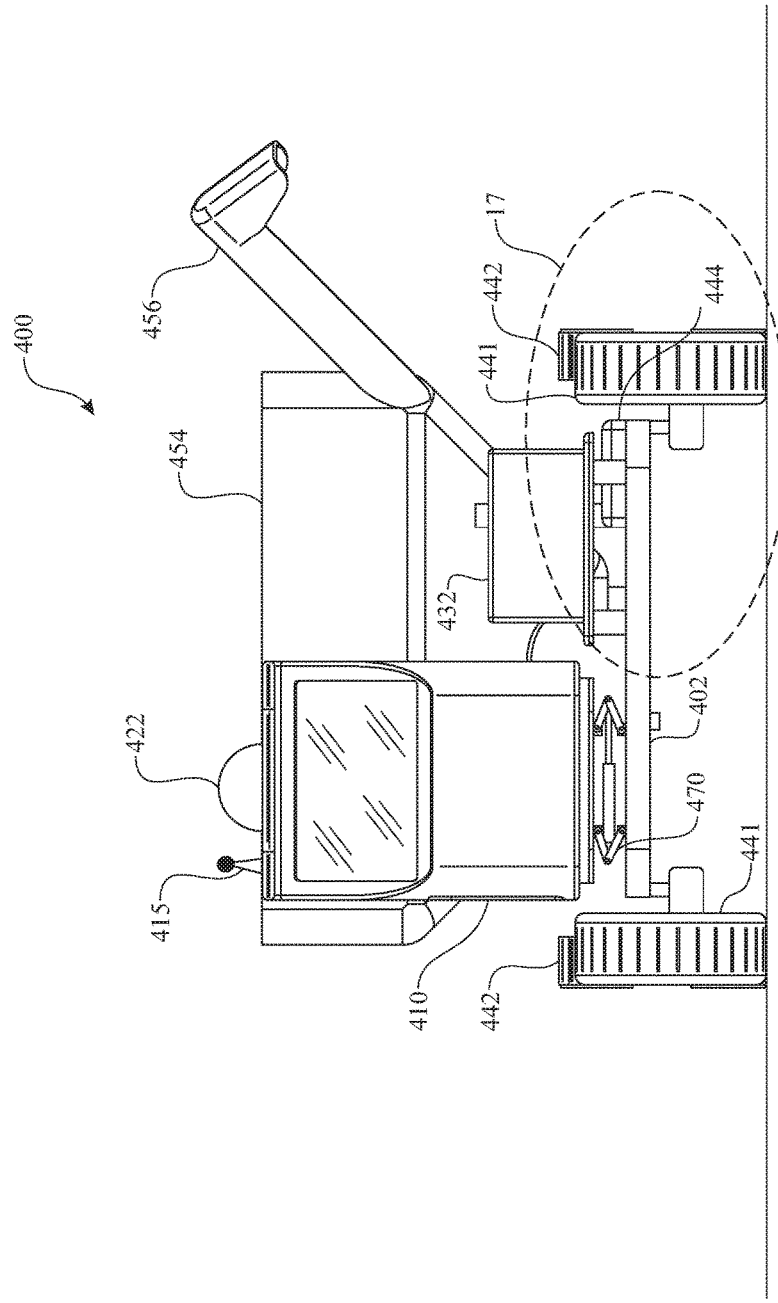
FIG. 16 presents a front elevation view of the autonomous grain cart of FIG. 14.

A partition 455 laterally bifurcates the grain bin 452 into two distinct compartments. As best illustrated in FIG. 15, the grain bin 454 has a bottom configured as a collection bin 459 from which the unload apparatus 456 collects and removes the grain when the grain cart 400 is unloaded. A grate 462 on each side of the partition 455 has a plurality of apertures 463 therethrough and separates the collection bin 459 from the grain bin 454. A slidable grate door 464 is selectively movable in a known manner to permit or block grain to flow from the gravity bin 454 into the collection bin 459. By using doors 464 to block the grain flow until such time as the grain bin 454 is desired to be unloaded, prevents the grain from packing about the entry to the unload apparatus 456 and placing undesired loads upon the unload mechanism 456 which can physically damage the grain.

Figure 17:
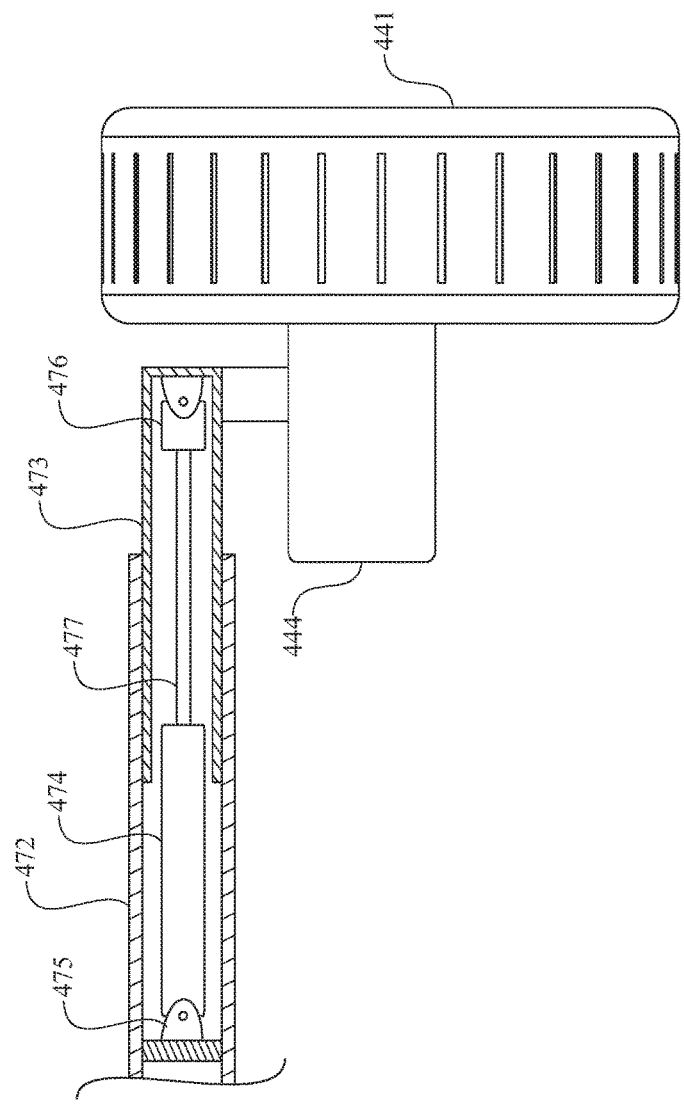
FIG. 17 presents a partial cross-sectional view of the extendable axle of the autonomous grain cart highlighted by Area 17 of FIG. 16.

As illustrated in FIG. 17, by way of example, the axles of the autonomous grain cart 400 can be selectively extended and retracted to adjust the track width of the front wheels 441 and the agricultural tracks 442 at the rear axle. The axle is comprised of an outer box beam 472 which has a first end of a hydraulic cylinder 474 having a hydraulic ram 477 is attached internally thereto. And inner box beam 473 is telescopically received in outer box beam 472 and is laterally slidable therein. A second end 476 of the hydraulic ram 477 is attached internally to the inner box beam 473. Activation of the hydraulic cylinder 474 selectively moves the wheel 441 and electric drive motor 442 laterally with respect to the frame 402 of the autonomous grain cart 400. In this manner, the drive units 441, 442 can be adjusted to track with designated tracks in a tramway or when following a combine 180 (FIG. 5) to track in concert with the wheels of the combine 180.

Figure 18:
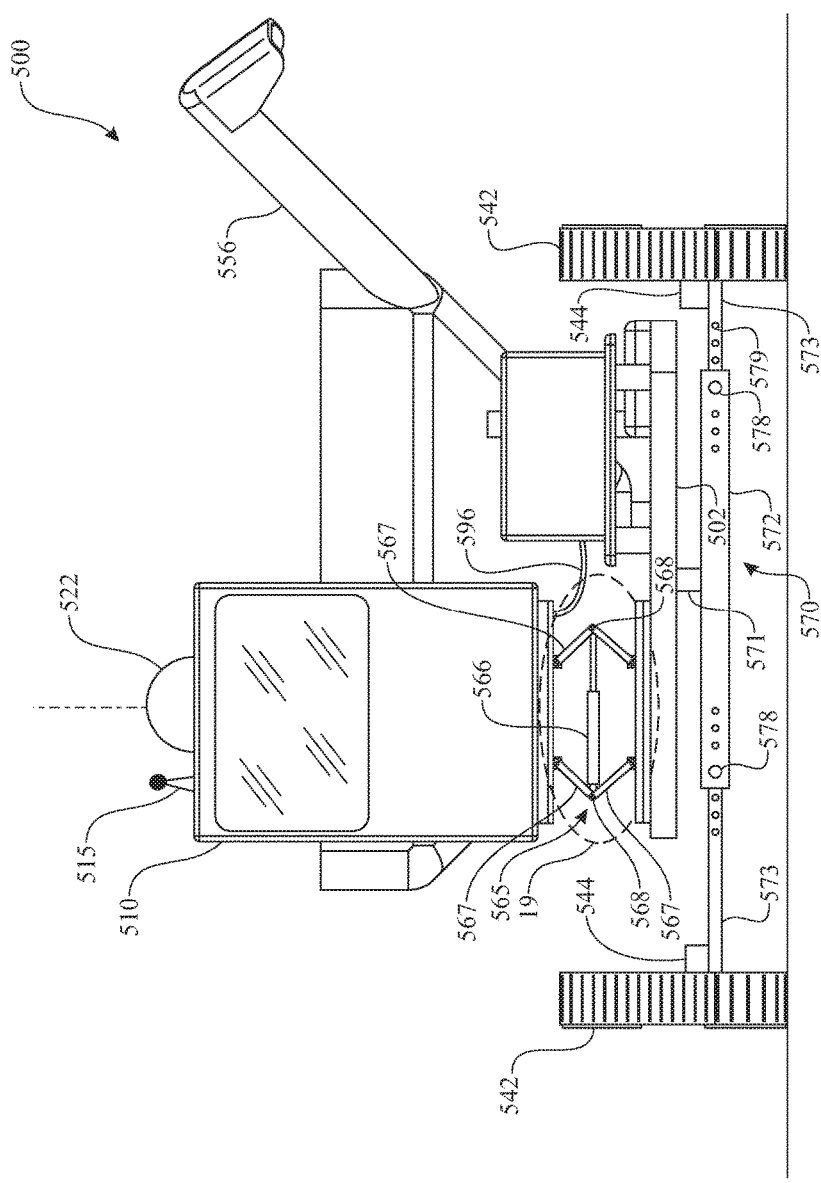
FIG. 18 presents a front elevation view of a further embodiment of an autonomous grain cart having an adjustable front axle which is centrally pivoted.
Figure 19:
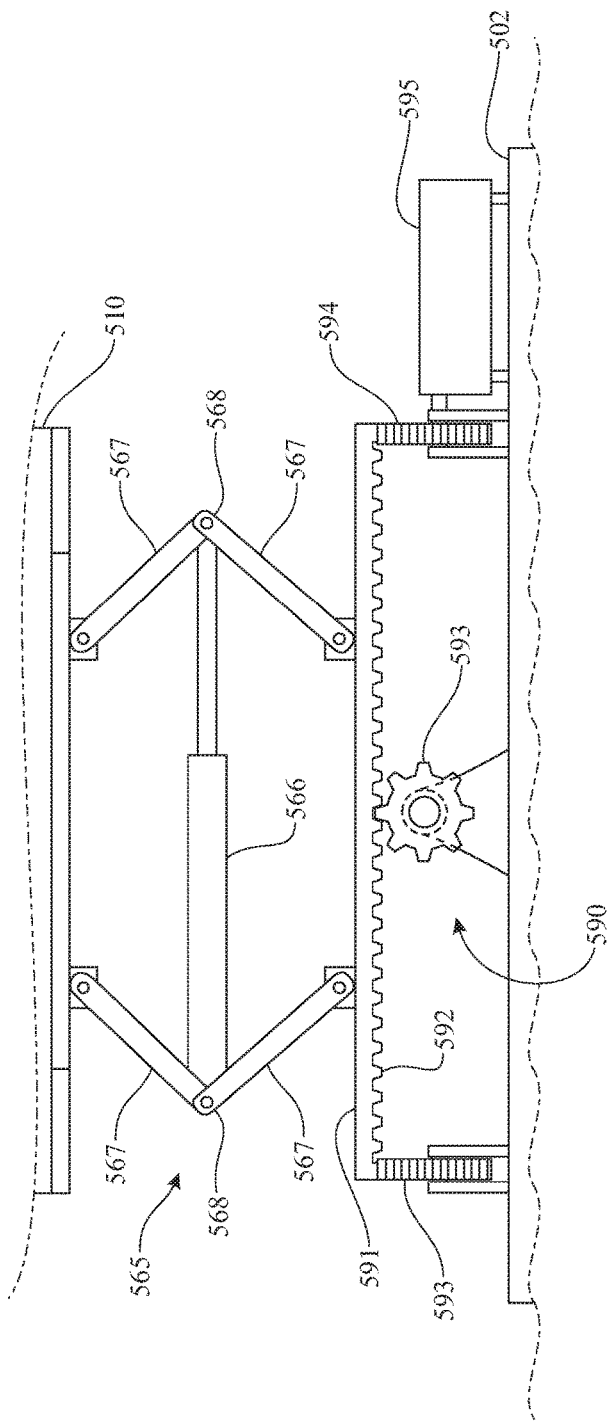
FIG. 19 presents a front elevation view of highlighted Area 19 of FIG. 18 illustrating the pivoting and raising mechanism for the operator's cab.

Another embodiment autonomous grain cart 500 is illustrated in FIGS. 18-19 wherein like features to autonomous grain cart 100, 200, 300, 400 are identified with like reference numerals preceded by the numeral "5". The autonomous grain cart 500 incorporates agricultural tracks 542 at both its front and rear axles. The front axle positioned most proximate to the operator's cab 510 is attached to frame 502 with a central pivot 571. An outer box beam 572 is centrally affixed to the central pivot 571 and receives an inner box beam 573 at each end thereof and agricultural track 542 and electric drive motor 544 are located at the distal ends of the respective inner box beam 573. Those practiced in the art will understand that the necessary electrical control cables for control of the electric drive motors 544 and agricultural tracks 542 are routed along the axle but have been deleted for the sake of clarity. The outer beam 572 and the inner beam 573 have a plurality of regularly spaced holes 579 therealong. The width between the agricultural tracks 542 can be manually adjusted by aligning holes 579 in the outer beam 572 with holes in the inner beam 579 and affixed at a desired configuration with a bolt or pen 578 received in one or more holes 579. Steering of the autonomous grain cart 500 is accomplished through the application of differential speeds of the laterally opposed agricultural tracks. A left turn is accomplished when the speed of the right-hand agricultural track 542 has a speed greater than the left hand agricultural track 542 and vice versa. The outer box beam 572 affixed to the central pivot 571 free pivots thereabout and turning is solely accomplished by the differential speeds of the tracks 542. The free pivoting helps to minimize berming and disruption of the soil surface normally experienced when agricultural tracks remain oriented in a forward direction and slewed by breaking action on the individual tracks 542.

The autonomous grain cart 500 is configured for bidirectional operation and requires that the operator's cab 510 have the capability to rotate 180 degrees from front facing to rear facing depending on the direction of operation and when operating in a grain bin forward orientation the operator's cab 510 must also raise to permit an operator, when present, to view over the grain bin. As best illustrated in FIG. 19, the operators cab 510 can be raised and lowered by operation of a scissors mechanism 565 wherein a plurality of linear scissors links 567 are pivotally attached one to another in a manner known in the art and further wherein a hydraulic cylinder 566 extends between opposing pivot joints 568. Retraction of the hydraulic cylinder 566 translates pivot joints 568 closer one to the other and thus raising the operators cab 510 to a raised position so that an operator can see above the upper rim of the grain bin.

As also shown in FIG. 19, the operator's cab 510 and the scissors lift mechanism 565 are mounted on a circular plate 591 which can be journaled (not shown) to rotate about its center to facilitate the 180 degree rotation of the operator's cab 510 the circular plate 591 includes a circular rack gear 592 extending downward from a lower outer periphery of the circular plate 591 and is supported by a plurality of pinion gears 593 supported by frame 502 and of which at least one pinion gear 594 is operably connected to an electric motor 595 to rotate the operators cab 510 between a forward facing orientation and a rear facing orientation. An electrical signal harness 596 extends from the operator's cab 510 to cart systems external of the operator's cab 510 to transmit control signals to operate those systems external to the operator's cab 510 since the rotation of the operator's cab 510 generally precludes mechanically linked controls.

To ensure full maneuverability of the autonomous grain cart 100, 200, 300, 400, 500 and the ability to accurately follow the footprint of the combine 180 under less-than ideal conditions, the drive-train for the autonomous cart needs to be different than a standard grain cart having one or more axles being pulled behind a tractor with two or more axles in traditional operation. The autonomous grain cart 100, 200, 300, 400, 500 has a configuration wherein the grain bin (154, et al) is mounted above the primary drive axle and drive units (140, et al), wheels or agricultural tracks, thus providing maximum traction. Under field conditions when operating in a grain bin forward orientation the trailing axle is the steering axle and provides maximum control. However, high-speed performance and stability is generally compromised with the rear-wheel steering designs. Therefore, the autonomous grain cart, with the ability to reverse direction to a cab forward configuration allows the steering axle to lead and resolves this problem.

Figure 20:
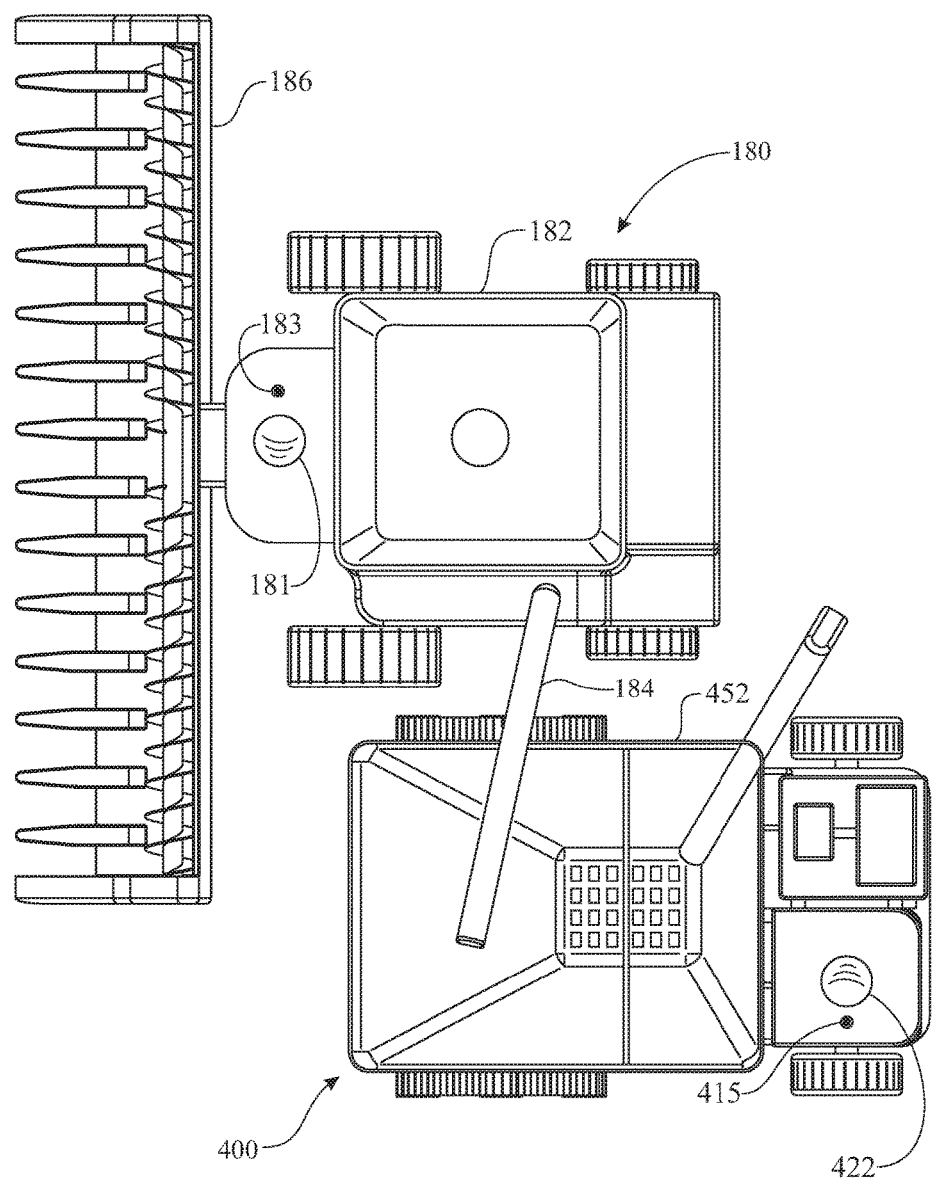
FIG. 20 presents a top plan view of an autonomous grain cart closely coupled in autonomous mode with a combine.

Turning to FIG. 20, an autonomous grain cart 400 can also operate in a close-coupled manner with a combine 180 such that both implements can traverse the field in a side-by-side formation. Present grain carts pulled by a tractor are unable to accomplish this since the width of the header 186 would interfere and block the tractor pulling the grain cart, thus preventing the grain cart from being positioned to receive harvested grain from the unload auger 184. An autonomous grain cart 400 operating in a bin forward direction, on the other hand, is able to operate side-by-side with the combine 180 to receive harvested grain from the unload auger 184 of the combine 180. When operated by a vehicle operator, the autonomous grain cart operators cab can be raised and rotated as above so the operator is able to view in the direction of travel over the grain bin of the grain cart 400. The autonomous grain cart 400 can also automatically maintain station with the combine 180 through the use of vehicle proximity sensors, GPS, and electronic communication utilizing antenna 183, on the combine 180 and antenna 415 on the autonomous grain cart 400.

While the described grain carts 100, 200, 300, 400, and 500 are designed for use on tramlines, they can just as easily be used in traditional field operations if biomass is not being harvested or compaction is not an issue.

The self-propelled trailing grain cart 100, when short-coupled to a combine 180, solves the issues of indiscriminate and random passages over the field which cause excessive soil compaction and biomass contamination. The short-coupling of the grain cart 100 to the combine 180 is feasible since the unload auger 184 of most current combines can operate in the rear-facing storage position simply by bypassing the switch that prevents operation in the stored position, and since unload auger 184 typically protrude over the trailing end of the combine 180. Precision pairing software which allows one piece of agricultural equipment to precisely follow another piece is available and allows autonomous close-coupled operation in the dust frequently associated with combine operation. However, the length of a standard tractor pulling a trailing catch-cart or of existing designs of self-propelled catch carts are so long that extraordinary extensions are still required for the unload auger 184 on the combine 180. Creating a self-propelled grai cart 100, which reduces the combined length of the grain cart and the tractor pulling it, resolves that problem and makes it easy for a farmer to adopt the use of tramlines while running large headers such as headers having a width greater than 30 feet.

The adoption of tramlines maximizes the quantity and quality of biomass which can effectively be removed from a field and hence the value of the biomass co-product produced by an agricultural field. At the same time, the routine use of tramlines minimizes soil compaction across a field and hence increases the production of both grain and associated biomass within a field.

By optimizing the biomass removal rate, a farmer can eliminate the typical deep tillage operation, which independently creates soil compaction, at the end of the previous crop's growing season (or at the beginning of the following season) and adopt no-till or minimum-till production approaches.

While agricultural tracks are known to be disadvantageous for causing ridges and berms, this can be minimized to a degree by proper track design. The best solution is to provide an independently controllable power source to each drive unit in a pair of drive units (i.e., set of tracks or steerable axle with wheels or tracks on each end). This allows the speed of each wheel to be dynamically adjusted based upon the turning radius of each individual track or wheel and the traction at the wheel level. This differential speed capability enables a shorter turning radius, increased maneuverability (especially in adverse conditions) and in extreme conditions, allows right and left side tracks/wheels to operate in opposite directions. The ability to operate right and left tracks at different speeds enhances operational efficiency in difficult situations such as operation on sideslopes or in slippery conditions such as mud, snow, ice, etc.

Electric operation enables each wheel or track to be individually powered and simplifies control; but hydraulic and mechanical systems with similar characteristics could be devised (which reduces parts count and simplifies engineering and build issues. Appropriate selection of an electric motor is important and a motor such as the switched reluctance motor design offers unique benefits in a grain cart operation including full torque at stall and the potential for high rotational rates which can allow for direct drive. The ability to control the speed of individual wheels or tracks on turns thereby accounting for differences in the turning radius and for wheel or track slippage has significant benefits. Independently powered front (or rear) steering wheels can reduce the actual turning radius and thereby minimizing rutting and berming. A short turning radius is important because it permits tramlines to be established on headlands as well as across the length of the field. Additional advantages are apparent when traction is impaired by mud, frozen ground, side slopes, ice, snow, etc.

Because operation of powerful agricultural equipment in close proximity creates specific mechanical and human risks, an emergency stop (E-stop) system can be incorporated into the operating system for both the combine 180 and the grain cart 100. The E-stop may be activated by unexpected physical contact between equipment components, by monitored equipment malfunction, or by the wireless intervention of human operators.

The potential for autonomous operation is an important (but not absolutely necessary) component of this design. Labor qualified to operate a grain cart is in short supply within the agricultural arena, and autonomous operation can be an important factor in optimizing the use of the available labor pool within an agricultural production operation. In addition, autonomous operation is inherently safer for both equipment and personnel during close-coupled operation.

The proposed system can support the use of multiple autonomous grain carts 100. The use of multiple carts 100 permits loads to be controlled at the grain cart level and represents an effective way to control soil compaction due to operation of grain carts 100 with high loads.

Additionally, the grain cart 100 can also include enhanced features such as being equipped with appropriate extensions so as to both enable loading and to minimize grain damage/loss while receiving grain from combines with less than optimal unload "auger" lengths. The hopper 152 can have a capacity (but not necessarily operated at that capacity) to fill an over-the-road transport vehicle(s) to capacity in a single fill, and the unload apparatus 156 can have a high unload capacity (i.e. 300 bushels per minute) with "gentle" treatment of grain to enable rapid filing of over-the-road vehicles. The grain cart 100 can include the potential for using a deployable drop down ladder for loading grain transport containers such as semi-trailers. The hopper 152 and the unload apparatus 156 can be constructed of foodsafe components such as stainless steel, engineered plastic, etc. for those components in contact with grain. The hopper 152 can also include features for easy clean-out (100%) with visual verification to preclude cross-contamination between loads when required. Video imaging can be incorporated to monitor key functions (unload auger discharge, primary bin, back-up, etc.), and accurate load sensor(s) can be incorporated to monitor load weight. Debris deflectors can be incorporated to shield the grain cart 100 from grain harvesting debris discharged by the combine 180.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What I claim is:

1. An autonomous self-propelled grain cart for shortcoupled operation with a grain harvesting combine, the autonomous self-propelled grain cart comprising:

a frame;

an operator's cab supported by the frame, the operator's cab rotatable about a vertical axis between a forward facing orientation and a rear facing orientation and further wherein the operator's cab is selectively raised and lowered along the vertical axis, the operator's cab including interactive controls for steering, regulating propulsion, and utility operation by an operator occupying the operator's cab, the interactive controls generating control signals for transmission via an electrical signal harness to operate systems external to the operator's cab;

a plurality of drive units affixed to the frame for propelling the autonomous grain cart over a surface of an agricultural field;

a grain hopper affixed to and supported by the frame, the grain hopper further including a grain bin for receiving harvested grain and an unloading apparatus for removing the grain from the grain bin;

a power system mounted to the frame and operationally communicative with the drive units and the unloading apparatus;

a positioning system for determining a geographical position of the grain cart; and a control system further comprising:
a central processing unit having an associated memory;
a display;
a user input device; and
an instruction set resident in the memory and executable by the central processing unit wherein the instruction set when executed and integrated with the positioning system functions to autonomously maintain a short-coupled position with respect to a combine operating on an agricultural field.

2. The autonomous self-propelled grain cart according to claim 1 wherein the power system comprises an electrical generator driven by an internal combustion engine and further wherein each of the drive units includes a variable speed electric motor electrically communicative with the electrical generator.

3. The autonomous self-propelled grain cart according to claim 2 wherein at least one of the drive units further includes a brake, and one of the group consisting of a wheel and an agricultural track.

4. The autonomous self-propelled grain cart according to claim 2 wherein the variable speed electric motor of each of the drive units is a switched reluctance electric motor.

5. The autonomous self-propelled grain cart according to claim 2 wherein the drive units are mounted to an end of an axle selectively adjustable to modify a lateral spacing between the drive units.

6. The autonomous self-propelled grain cart according to claim 5 wherein the axle comprises an outer box beam and an inner box beam telescopically movable within the outer box beam.

7. The autonomous self-propelled grain cart according to claim 6 including a hydraulic cylinder having a first end affixed to the outer box beam and a second end affixed to the inner box beam to telescopically move the inner box beam with respect to the outer box beam.

8. The autonomous self-propelled grain cart according to claim 1 wherein each of the drive units is independently steerable of others of the drive units.

9. The autonomous self-propelled grain cart according to claim 1 wherein the control system receives operational inputs from the interactive controls and further wherein in response thereto the control system generates electrical operational commands to the drive units, said operational commands including at least steering commands, acceleration commands, deceleration commands, and braking commands.

10. The autonomous self-propelled grain cart according to claim 1 wherein the frame includes at least one attach point for hard coupling the self-propelled autonomous grain cart to the combine.

11. The autonomous self-propelled grain cart according to claim 1 wherein the grain bin includes a partition separating the grain bin into at least two compartments.

12. An autonomous self-propelled grain cart for short-coupled operation with a grain harvesting combine, the autonomous self-propelled grain cart comprising:
a frame;
a plurality of drive units affixed to the frame for propelling said autonomous self-propelled grain cart over a surface of an agricultural field, at least two laterally opposed ones of the drive units defining a primary drive axle and at least two laterally opposed ones of the drive units defining a steering axle, each of the drive units including a variable speed electric motor, a brake, and a traction member selected from the group consisting of a wheel and an agricultural track;
a power system mounted to the frame and operationally communicative with the drive units, the power system including an electrical generator driven by an internal combustion engine, the electrical generator electrically communicative with the variable speed electric motors of the drive units;
an operator's cab supported by the frame at the steering axle, the operator's cab rotatable about a vertical axis between a forward facing orientation and a rear facing orientation and further wherein the operator's cab is selectively raised and lowered along the vertical axis, the operator's cab including interactive controls for steering, regulating propulsion, and utility operation by an operator occupying the operator's cab, the interactive controls generating control signals for transmission via an electrical signal harness to operate systems external to the operator's cab;
a grain hopper affixed to and supported by the frame at the primary drive axle, the grain hopper further including a grain bin for receiving harvested grain and an unloading apparatus electrically communicative with the power system for removing the grain from the grain bin;
a positioning system for determining a geographical position of the grain cart; and
a control system further comprising:
a central processing unit having an associated memory;
a display;
a user input device; and
an instruction set resident in the memory and executable by the central processing unit wherein the instruction set when executed and integrated with the positioning system functions to autonomously control the self-propelled autonomous grain cart operating on an agricultural field; wherein:
the autonomous self-propelled grain cart is bi-directionally operable wherein a first operable directional configuration is a forward facing operator's cab orientation, steering axle forward orientation, and wherein a second operable directional configuration is a drive axle forward, operator's cab rearward orientation, the operator's cab being raised and rotated 180 degrees about its vertical axis.

13. The autonomous self-propelled grain cart according to claim 12 wherein the variable speed electric motor of each of the drive units is a switched reluctance electric motor.

14. The autonomous self-propelled grain cart according to claim 12 wherein each of the drive units is independently steerable of others of the drive units.

15. The autonomous self-propelled grain cart according to claim 12 wherein the drive units are mounted at an end of an axle having an outer box beam and an inner box beam telescopically received therein and selectively adjustable to modify a lateral spacing between the drive units.

16. The autonomous self-propelled grain cart according to claim 12 including a hydraulic cylinder having a first end affixed to the outer box beam and a second end affixed to the inner box beam to telescopically move the inner box beam with respect to the outer box beam.

17. The autonomous self-propelled grain cart according to claim 12 wherein the control system receives operational inputs from the interactive controls and further wherein in response thereto the control system generates electrical operational commands to the drive units, the operational commands including at least steering commands, acceleration commands, deceleration commands, and braking commands.

18. A method of short-coupling an autonomous self-propelled grain cart to a combine for agricultural field harvesting operations wherein the combine is of the type incorporating systems for continuously transmitting the combine physical position during the field harvesting operations, the method comprising the steps:

obtaining an autonomous self-propelled grain cart having a frame, an operator's cab supported by the frame and rotatable about a vertical axis between a forward facing orientation and a rear facing orientation and selectively raised and lowered along the vertical axis, the operator's cab also including interactive controls for steering, regulating propulsion, and utility operation, a plurality of independently steerable drive units affixed to the frame for propelling the grain cart, a grain hopper affixed to the frame, a power system mounted to the frame and operationally communicative with the drive units, a positioning system, and a control system including a central processing unit having an associated memory, a display, a user input device, and an instruction set resident in the memory and executable by the central processing unit for autonomously directing the grain cart across a surface of an agricultural field;

determining a desired physical position of the autonomous self-propelled grain cart with respect to the combine;

inputting the desired physical position of the autonomous self-propelled grain cart to be maintained into the central processing unit memory;

receiving the transmitted combine position;

calculating steering and velocity inputs for each drive unit to maintain the desired physical position with respect to the combine;

sending the calculated steering and velocity inputs to the drive units; and repeating the receiving, the calculating, and the sending steps to continuously maintain the desired physical position with respect to the combine.

19. The method according to claim 18 wherein the positioning system is a global positioning system.

20. The method according to claim 18 wherein the desired position of the autonomous self-propelled grain cart is calculated relative to an outlet of an unload spout of the combine and wherein the combine further includes drive units and the drive units of the grain cart substantially track the drive units of the combine.

* * * * *